(12) United States Patent
Wang et al.

(10) Patent No.: US 12,015,849 B2
(45) Date of Patent: Jun. 18, 2024

(54) CAMERA MODULE AND ELECTRONIC DEVICE

(71) Applicant: Huawei Technologies Co., Ltd., Shenzhen (CN)

(72) Inventors: Gang Wang, Dongguan (CN); Xin Li, Shenzhen (CN); Wei Tang, Dongguan (CN); Dengfeng Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 17/780,850

(22) PCT Filed: Nov. 11, 2020

(86) PCT No.: PCT/CN2020/127967
§ 371 (c)(1),
(2) Date: May 27, 2022

(87) PCT Pub. No.: WO2021/104013
PCT Pub. Date: Jun. 3, 2021

(65) Prior Publication Data
US 2023/0007176 A1  Jan. 5, 2023

(30) Foreign Application Priority Data
Nov. 30, 2019  (CN) .......................... 201911209175.2

(51) Int. Cl.
*H04N 23/68*      (2023.01)
*H04M 1/02*       (2006.01)
(Continued)

(52) U.S. Cl.
CPC ........ *H04N 23/687* (2023.01); *H04M 1/0264* (2013.01); *H04N 23/54* (2023.01);
(Continued)

(58) Field of Classification Search
CPC ...... H04N 23/687; H04N 23/67; H04N 23/54; H04N 23/57; H04N 23/55
(Continued)

(56) References Cited

U.S. PATENT DOCUMENTS

2011/0176047 A1  7/2011  Wakahara et al.
2013/0002933 A1  1/2013  Topliss et al.
(Continued)

FOREIGN PATENT DOCUMENTS

CN  102770804 A  11/2012
CN  103576414 A  2/2014
(Continued)

*Primary Examiner* — Joel W Fosselman
(74) *Attorney, Agent, or Firm* — Conley Rose, P.C.

(57) ABSTRACT

A camera system includes a module frame, a camera lens, an image sensor, and an SMA motor that are stacked within the module frame. The camera lens is fixedly connected to the module frame, and the SMA motor is located on an out-light side of the camera lens. The image sensor is located between the camera lens and the SMA motor and is fastened to the SMA motor. The SMA motor is configured to actuate the image sensor to shift in a direction parallel to an optical axis of the camera lens. The SMA motor is further configured to actuate the image sensor to shift on a plane perpendicular to the optical axis of the camera lens.

18 Claims, 19 Drawing Sheets

(51) Int. Cl.
*H04N 23/54* (2023.01)
*H04N 23/55* (2023.01)
*H04N 23/57* (2023.01)
*H04N 23/67* (2023.01)

(52) U.S. Cl.
CPC ............. *H04N 23/55* (2023.01); *H04N 23/57* (2023.01); *H04N 23/67* (2023.01)

(58) Field of Classification Search
USPC .......................................................... 348/374
See application file for complete search history.

(56) References Cited

U.S. PATENT DOCUMENTS

| | | |
|---|---|---|
| 2013/0300880 A1 | 11/2013 | Brown et al. |
| 2015/0113974 A1 | 4/2015 | Howarth |
| 2015/0346507 A1 | 12/2015 | Howarth |
| 2018/0149142 A1 | 5/2018 | Bunting et al. |
| 2018/0321503 A1* | 11/2018 | Brown ................. G02B 27/646 |
| 2018/0348593 A1 | 12/2018 | Brown |
| 2019/0120214 A1 | 4/2019 | Brown et al. |
| 2019/0361225 A1 | 11/2019 | Cho et al. |
| 2021/0003119 A1 | 1/2021 | Brown et al. |

FOREIGN PATENT DOCUMENTS

| | | |
|---|---|---|
| CN | 104204935 A | 12/2014 |
| CN | 205987122 U | 2/2017 |
| CN | 107682604 A | 2/2018 |
| CN | 108141541 A | 6/2018 |
| CN | 109618080 A | 4/2019 |
| CN | 109901275 A | 6/2019 |
| CN | 109901346 A | 6/2019 |
| CN | 109901347 A | 6/2019 |
| CN | 209402560 U | 9/2019 |
| WO | 2018158590 A1 | 9/2018 |
| WO | 2019034860 A1 | 2/2019 |
| WO | 2019162694 A1 | 8/2019 |

* cited by examiner

CAMERA MODULE AND ELECTRONIC DEVICE

CROSS-REFERENCE TO RELATED APPLICATIONS

This is a U.S. National Stage of International Patent Application No. PCT/CN2020/127967 filed on Nov. 11, 2020, which claims priority to Chinese Patent Application No. 201911209175.2 filed on Nov. 30, 2019. Both of the aforementioned applications are hereby incorporated by reference in their entireties.

TECHNICAL FIELD

Embodiments of this application relate to the field of photographing technologies, and in particular, to a camera module and an electronic device.

BACKGROUND

As a photographing function of a smartphone camera becomes increasingly powerful, auto focus (auto focus, AF) and an optical image stabilizer (optical image stabilizer, OIS) gradually become one of main selling points and competitive edges of the smartphone camera.

The auto focus is configured to make images of objects at different distances clear on an image sensor. A conventional camera module usually controls an optical camera lens (lens) to shift in an optical axis direction to adjust a distance between the camera lens and the image sensor, thereby implementing the auto focus.

The optical image stabilizer is configured to detect and feed back jitter of a smartphone in real time within a specific frequency and amplitude range, and perform reverse compensation on the jitter during photographing. Because the compensation is usually obtained by correcting an optical path through an optical lens (lens), compared with improving a gain by using a software algorithm, the optical image stabilizer greatly ensures a good image quality with minor loss.

Currently, a common auto focus and optical image stabilization motor of the conventional camera module is mainly a voice coil motor (voice coil motor, VCM). The voice coil motor includes a motor frame, a carrier, and five pairs of actuating members, and the carrier and the actuating members are located within the motor frame. Each pair of actuating members include a magnet and a coil. One pair of actuating members are used as auto focus actuating members, are formed in the carrier, and are configured to actuate the camera lens to shift in the optical axis direction relative to the carrier, thereby implementing auto focus. The other four pairs of actuating members are used as optical image stabilization actuating members, and are separately located around the carrier. One of the magnet and the coil in each pair of actuating members is fastened to the carrier, and the other is fastened to the motor frame. Controlling on/off and a magnitude of a current passing through the coils of the four pairs of actuating members enables the carrier together with the camera lens to shift on a plane perpendicular to an optical axis of the camera lens. This implements optical image stabilization in a camera lens shift (lens shift) manner.

When the voice coil motor shifts the camera lens, electromagnetic forces between the voice coils and the magnets are required to actuate the camera lens, the auto focus actuating members, the carrier, and the four pairs of voice coils or the four pairs of magnets fastened to the carrier to shift at the same time. Consequently, such a heavy load leads to a high power consumption of the voice coil motor.

SUMMARY

An objective of embodiments of this application is to provide a camera module with a low power consumption and an electronic device.

According to a first aspect, embodiments of this application provide a camera module. The camera module includes a module frame, a camera lens, an image sensor, and an SMA motor, where the camera lens, the image sensor, and the SMA motor are stacked within the module frame. The camera lens is fixedly connected to the module frame. The SMA motor is located on an out-light side of the camera lens. The image sensor is located between the camera lens and the SMA motor and is fastened to the SMA motor. The SMA motor is configured to actuate the image sensor to shift in a direction parallel to an optical axis of the camera lens. The SMA motor is further configured to actuate the image sensor to shift on a plane perpendicular to the optical axis of the camera lens, and/or actuate the image sensor to rotate to tilt relative to the optical axis of the camera lens.

Compared with a conventional voice coil motor solution, this embodiment provides the camera module that implements auto focus and optical image stabilization by shifting the SMA motor and/or rotating the image sensor. An actuation load of the SMA motor is greatly reduced, so that a power consumption of the SMA motor is reduced. Therefore, a power consumption for the camera module to implement auto focus and optical image stabilization is low. In addition, the camera module further simplifies a motor structure to miniaturize the module, and implements both auto focus and image stabilization functions by using a non-electromagnetic force principle to eliminate magnetic interference.

In addition, due to a light convergence effect of the camera lens, compared with a conventional solution of shifting a camera lens to perform auto focus and optical image stabilization, this embodiment provides the camera module that requires a shorter compensated distance and a smaller compensated angle to actuate the image sensor to perform optical path compensation via the SMA motor. In this way, the power consumption of the SMA motor is further reduced, so that the power consumption for the camera module to implement auto focus and optical image stabilization is lower. In other words, under a same power consumption, the camera module in this embodiment has better auto focus performance and better optical image stabilization performance than the conventional solution.

When same auto focus performance and same optical image stabilization performance are achieved, how much the compensated distance and the compensated angle of the image sensor decrease by compared with a compensated distance and a compensated angle of a conventional camera lens is related to a lens structure of the camera lens. An expected compensated distance range and an expected compensated angle range of the image sensor may be obtained by optimizing the camera lens structure, so that the camera module has better performance, for example, a lower power consumption, a higher image stabilization feedback speed, and the like.

In some embodiments, the camera module may feed back an actual location of the image sensor during focus and image stabilization by using cable resistance of an SMA cable of the SMA motor, to implement a closed-loop control effect. Compared with a conventional solution, this embodiment needs no Hall sensor to be disposed. This simplifies a module structure and implements a better control effect.

In an optional embodiment, the SMA motor includes a motor frame, a carrier, and eight SMA cables. The motor frame is fastened within the module frame, the carrier is located within the motor frame, and the image sensor is fastened to one side of the carrier facing the camera lens. The SMA cables shrink when being electrified and heated.

In this embodiment, heat generated when the SMA cables are electrified leads to a temperature rise of the SMA cables, so that a low-temperature martensite phase is transformed into a high-temperature austenite phase through a reverse phase transformation. The SMA cables are restored to what they were before deformation. In this way, the SMA cables shrink. When the SMA cables are not electrified and are in the low-temperature martensite phase, the SMA cables may be deformed under an external force. A length change due to shrinkage of the SMA cables is essentially caused by a transformation between material crystal phase structures, to be specific, the transformation between martensite and austenite. Gravity generated due to a crystal structure change (that is, a gap change between atoms) between microscopic particles makes a pulling force generated when the macro SMA cables shrink much greater than electromagnetic forces between common magnet coils. Therefore, the SMA cables may shrink to actuate a heavier load, that is, may implement a large load. In this way, the SMA motor can implement a large actuation force with a small size.

The SMA cables may shrink when being electrified and heated, to generate a corresponding pulling force on the carrier. The camera module may control electrical signals in the eight SMA cables, so that the eight SMA cables apply a combined force to the carrier in an expected direction. In this way, the carrier together with the image sensor is actuated to shift and/or rotate to an expected position in the expected direction, so that the camera module may implement auto focus and optical image stabilization by shifting and/or rotating the image sensor.

In an optional embodiment, the eight SMA cables are disposed in pairs, and each SMA cable includes a movable end and a fixed end. The movable ends of the four pairs of SMA cables are respectively fastened to four sides of the carrier, and the fixed ends of the four pairs of SMA cables are respectively fastened to different positions of the motor frame. Two pairs of SMA cables and the other two pairs of SMA cables are symmetrically disposed relative to a first reference plane. Two pairs of SMA cables on a same side of the first reference plane are symmetrically disposed relative to a second reference plane. Two SMA cables of a same pair are symmetrically disposed relative to a third reference plane. Both the first reference plane and the second reference plane are traversed by the optical axis of the camera lens, and the third reference plane is perpendicular to the optical axis of the camera lens.

In this embodiment, a position relationship among the eight SMA cables is limited, so that the camera module can control the combined force applied by the eight SMA cables to the carrier to actuate the carrier to shift along the first reference plane, shift along the second reference plane, shift in a direction parallel to the optical axis of the camera lens, and rotate to tilt relative to the optical axis of the camera lens by controlling the electrical signals in the eight SMA cables, Therefore, the carrier has a triaxial shift degree of freedom and a rotation degree of freedom when actuated by the eight SMA cables. The carrier together with the image sensor can shift and/or rotate to any position in an XY plane within a stroke range of the carrier, to implement auto focus and optical image stabilization of the image sensor.

In an optional embodiment, the carrier includes a first side, a second side, and a fourth side, where the second side and the fourth side are respectively connected to two sides of the first side. The first side and the second side are symmetrically disposed relative to the second reference plane. The first side and the fourth side are symmetrically disposed relative to the first reference plane. The third reference plane intersects with the first side, the second side, and the fourth side.

The eight SMA cables include a first SMA cable, a second SMA cable, a third SMA cable, a fourth SMA cable, a fifth SMA cable, a sixth SMA cable, a seventh SMA cable, and an eighth SMA cable. Both a movable end of the first SMA cable and a movable end of the second SMA cable are fastened to an end of the first side close to the second side, a fixed end of the first SMA cable is close to the second side relative to the movable end of the first SMA cable, and a fixed end of the second SMA cable is close to the second side relative to the movable end of the second SMA cable. The first SMA cable intersects with the second SMA cable, and the first SMA cable and the second SMA cable are symmetrically disposed relative to the third reference plane. The third SMA cable and the first SMA cable are symmetrically disposed relative to the second reference plane, and the fourth SMA cable and the second SMA cable are symmetrically disposed relative to the second reference plane. The fifth SMA cable and the third SMA cable are symmetrically disposed relative to the first reference plane, and the sixth SMA cable and the fourth SMA cable are symmetrically disposed relative to the first reference plane. The seventh SMA cable and the fifth SMA cable are symmetrically disposed relative to the second reference plane, and the eighth SMA cable and the sixth SMA cable are symmetrically disposed relative to the second reference plane.

In this embodiment, one end of the SMA cable is fastened at a diagonal position of the carrier. The other end of the SMA cable is fastened at a diagonal position of the motor frame, so that the SMA cable may have a sufficient length when space in the SMA motor is limited. In this way, the SMA cable has a sufficient amount of expansion, so that the SMA motor may have a larger actuation stroke range to lead to a better image stabilization performance of the camera module.

In an optional embodiment, the SMA motor further includes a circuit board, the circuit board is located between the motor frame and the module frame, and the image sensor is electrically connected to the circuit board through a plurality of bonding wires. The bonding wires may be gold wires or the like. Each bonding wire is long. When the image sensor shifts and/or rotates together with the carrier relative to the motor frame, the image sensor shifts and/or rotates relative to the circuit board, and the bonding wires are adaptively deformed with a shift and/or rotation of the image sensor. The long bonding wires are easier to be deformed and are unlikely to break, so that the bonding wires are highly reliable, and a service life of the camera module is long.

In an optional embodiment, the SMA motor further includes a circuit board, the circuit board is located between the motor frame and the module frame, the image sensor is electrically connected to the carrier through a plurality of bonding wires, and the carrier is electrically connected to the circuit board through a connecting wire. In this case, a corresponding connection circuit is formed on the carrier, and the connection circuit is used to connect the bonding wire to the connecting wire. The circuit may be formed by electroplating, by bonding a flexible circuit board, or by embedding metal through insert molding.

In an optional embodiment, a first electric-conductor is disposed on the carrier, a second electric-conductor is disposed on the motor frame, and the SMA motor further includes a conductive connecting piece. The second electric-conductor electrically connects the circuit board to the fixed end of the SMA cable, the movable end of the SMA cable is electrically connected to the first electric-conductor, and the conductive connecting piece electrically connects the first electric-conductor to the circuit board.

In this embodiment, the circuit board, the second electric-conductor, the SMA cable, the first electric-conductor, and the conductive connecting piece form a loop. The circuit board can supply power to the SMA cable, so as to control a shrinkage status of the SMA cable through an electrical signal.

In an optional embodiment, the conductive connecting piece is a spring, and the conductive connecting piece is located between the carrier and the motor frame. The motor frame further includes a third electric-conductor, and the third electric-conductor electrically connects the conductive connecting piece to the circuit board.

In this embodiment, the spring, as the conductive connecting piece cannot only achieve an electrical connection function, but also balance and buffer a force applied to the carrier when the SMA cables are electrified to actuate the carrier to shift or rotate together with the image sensor, which makes the carrier shift or rotate more stably. In addition, when the SMA cables are powered off, the spring can actuate the carrier together with the image sensor to shift or rotate back to an initial position by using an elastic force generated by deformation when the SMA cables are electrified to actuate the carrier to shift or rotate.

It should be noted that, the camera module inputs different electrical signals to different SMA cables, so that the different SMA cables can shrink independently of each other. In some embodiments, channels corresponding to the different SMA cables are independent of each other. For example, there are eight first electric-conductors, eight second electric-conductors, and eight conductive connecting pieces, one second electric-conductor, one SMA cable, one first electric-conductor, one conductive connecting piece, and one third electric-conductor form one channel, and an SMA motor forms eight channels independent of each other. In some other embodiments, the channels corresponding to the different SMA cables are partially shared, to simplify a circuit structure. For example, there are eight second electric-conductors, one first electric-conductor, one conductive connecting piece, and one third electric-conductor. Each of the eight second electric-conductors is respectively connected to one end of each of the eight SMA cables, and the other end of each of the eight SMA cables is connected to the first electric-conductor and the conductive connecting piece. In this embodiment, channels of different SMA cables have different positive inputs and a same negative output, and the channels of the different SMA cables may still input different electrical signals.

The first electric-conductor, the second electric-conductor and the third electric-conductor each may have a plurality of implementation structures, including but are not limited to a conducting wire, a conductive patch, a conductive mechanical part, or the like. Each electric-conductor may be formed by electroplating, by bonding a flexible circuit board, or by embedding metal through insert molding.

In an optional embodiment, the conductive connecting piece is a conducting wire, and the conductive connecting piece is connected to the circuit board. In this embodiment, the carrier is directly connected to the circuit board through the conductive connecting piece of the conducting wire structure, so that a transmission path through the motor frame can be omitted. This simplifies a circuit structure of the SMA motor. For example, there may be one or more conducting wires. When a plurality of conducting wires are designed, the plurality of conducting wires are divided into a plurality of groups, and the plurality of groups of conducting wires are symmetrically arranged.

In an optional embodiment, the camera module may further include an IR cut filter. The IR cut filter is installed within the module frame and located between the camera lens and the image sensor. In a thickness direction Z of the camera module, the IR cut filter, the camera lens, and the image sensor are stacked with each other at intervals. The IR cut filter is configured to filter infrared light, to improve imaging quality of the camera module. For example, the IR cut filter may be blue glass.

In an optional embodiment, the camera module further includes a prism, the prism is fastened within the module frame and is located on an in-light side of the camera lens, and the module frame has an in-light hole that is disposed facing the prism.

A conventional periscope camera module is provided with a plurality of groups of prism actuating motors, the prism actuating motors actuate the prism to rotate to implement image stabilization, and the voice coil motor actuates the camera lens to implement focus. This module structure is complex and difficult to implement, and has poor reliability. In this embodiment, the camera module actuates, through the SMA motor, the image sensor to shift or rotate, so as to implement auto focus and optical image stabilization. Therefore, compared with a conventional solution, this embodiment provides the camera module in which a prism actuating motor may be omitted, and the prism is fastened on the module frame. In this way, the module structure is simplified, the structure reliability is improved, the costs are reduced, and the power consumption is reduced on the basis that long-focus performance, auto-focus performance, and optical image stabilization performance are achieved.

According to a second aspect, embodiments of this application further provide an electronic device. The electronic device includes a housing, a processor, and the camera module according to any one of the foregoing embodiments. The processor and the camera module are accommodated in the housing, and the camera module is electrically connected to the processor. When the electronic device uses the camera module to perform photographing, a power consumption is low.

DESCRIPTION OF EMBODIMENTS

The following describes embodiments of this application with reference to the accompanying drawings in the following embodiments of this application.

Embodiments of this application provide a camera module and an electronic device to which the camera module is applied. The camera module uses a shape memory alloy (shape memory alloy, SMA) motor to actuate an image sensor to shift in a direction parallel to an axis of a camera lens. The SMA motor further can actuate the image sensor to shift on a plane perpendicular to the optical axis of the camera lens, and/or actuate the image sensor to rotate to tilt relative to the optical axis of the camera lens. In this way, the camera module has an auto focus function and an optical image stabilization function. In embodiments of this application, "A and/or B" includes three cases: "A", "B", and "A and B".

The SMA motor includes a carrier and a plurality of SMA cables connected to the carrier. The image sensor is fastened to the carrier. The SMA motor actuates the carrier to shift together with the image sensor by controlling electrical signals in the plurality of SMA cables. Therefore, the SMA motor has a simple structure and a small size. An actuation load of the SMA motor is the carrier and the image sensor with a small weight. Therefore, the SMA motor has a small actuation load and a low power consumption.

In addition, due to a light convergence effect of the camera lens, compared with a conventional solution of shifting a camera lens to perform auto focus and optical image stabilization, this embodiment provides the camera module that requires a shorter compensated distance (that is a stroke) and a smaller compensated angle to actuate the image sensor to perform optical path compensation via the SMA motor. In this way, the power consumption of the SMA motor is further reduced, so that the power consumption for the camera module to implement auto focus and optical image stabilization is lower.

The electronic device may be a mobile phone, a tablet computer, a notebook computer, a camera, a wearable device, a television, or the like. The wearable device may be a smart band, a smart watch, a smart head-mounted display, smart glasses, or the like.

Figure 1:
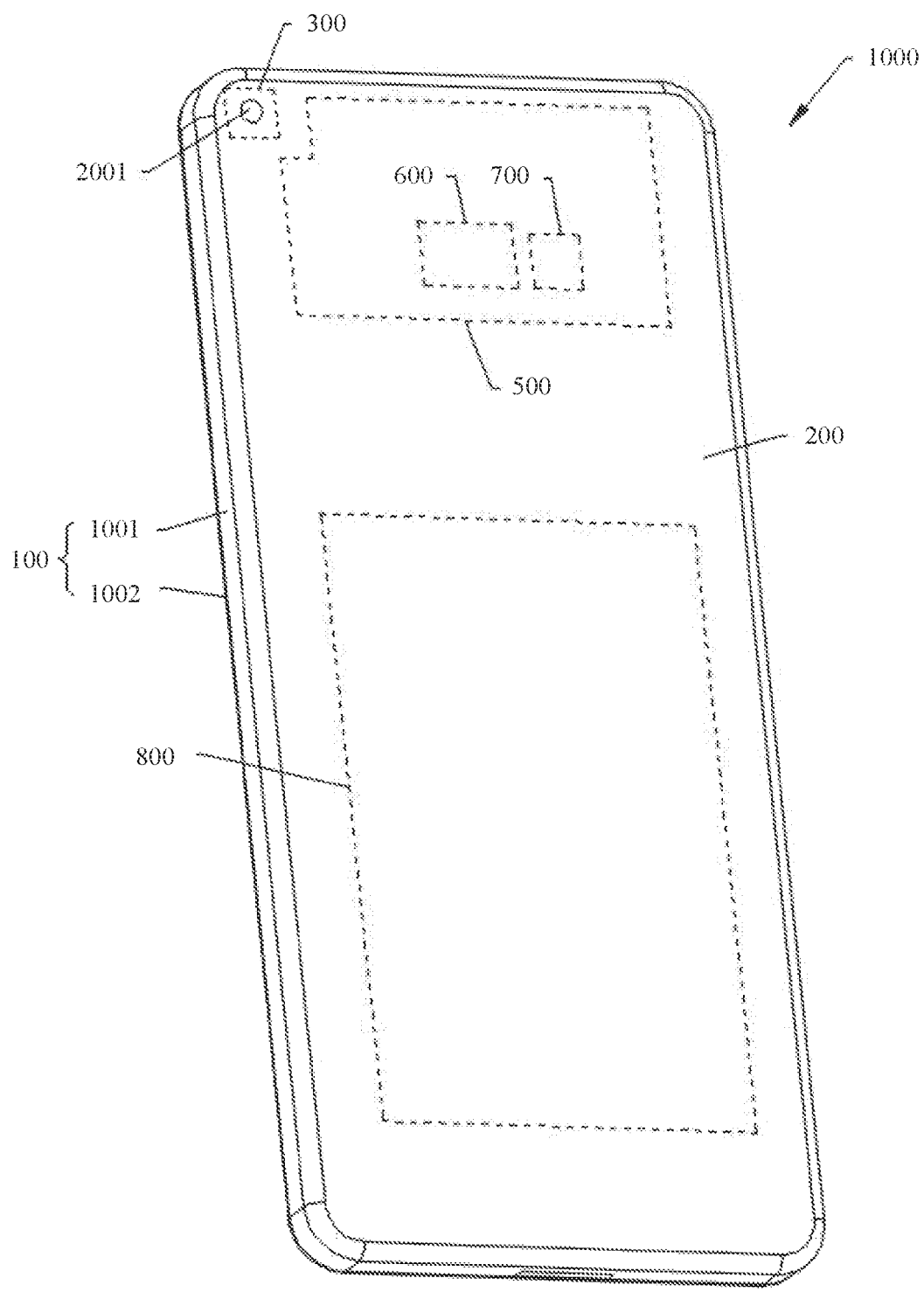
FIG. 1 is a schematic diagram of a structure of an electronic device according to an embodiment of this application.
Figure 2:
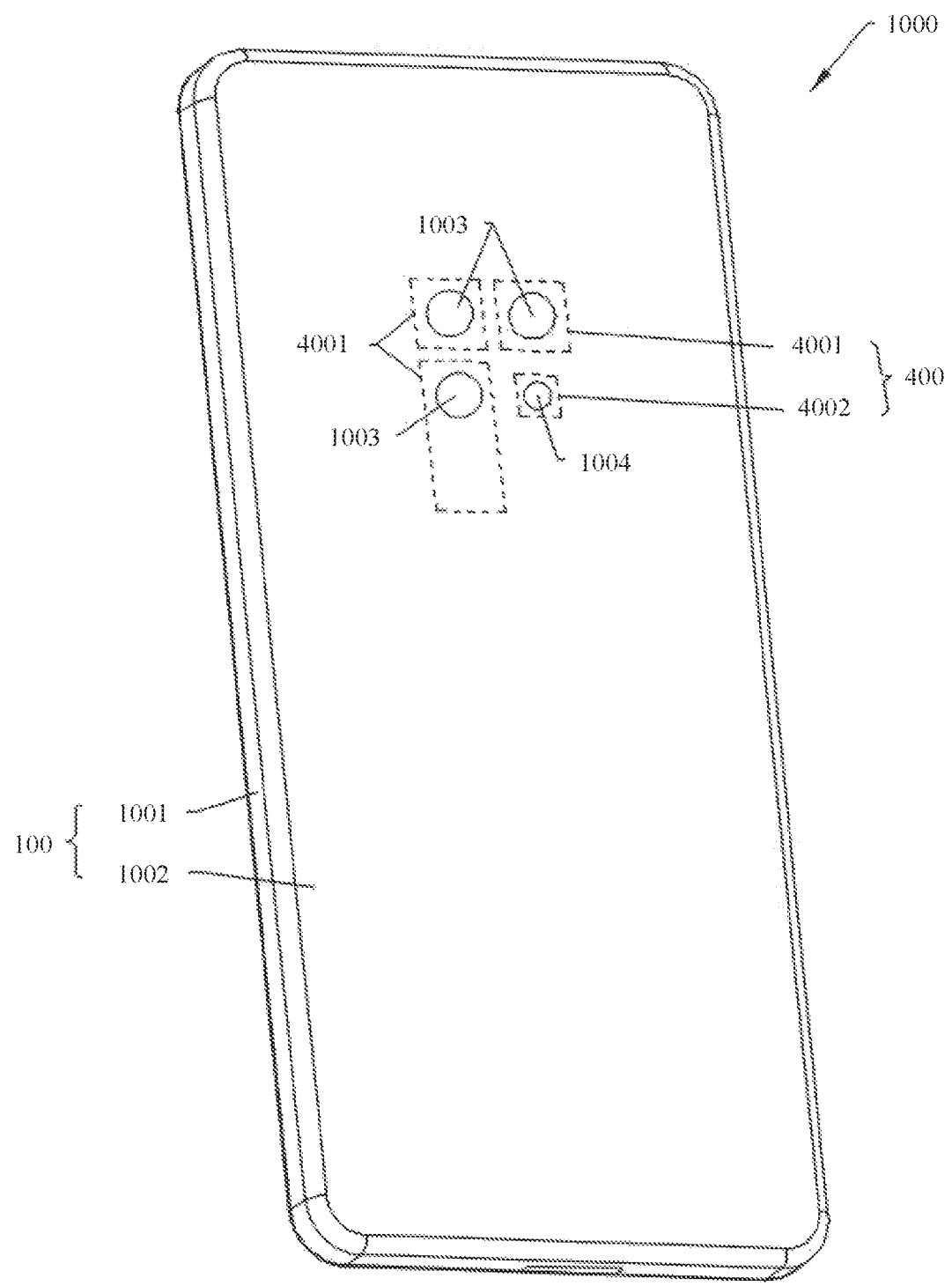
FIG. 2 is a schematic diagram of a structure of the electronic device shown in FIG. 1 from another angle.

Refer to FIG. 1 and FIG. 2 together. FIG. 1 is a schematic diagram of a structure of an electronic device 1000 according to an embodiment of this application, and FIG. 2 is a schematic diagram of a structure of the electronic device 1000 shown in FIG. 1 from another angle. This embodiment is described by using an example in which the electronic device 1000 is a mobile phone.

The electronic device 1000 includes a housing 100, a display 200, a front-facing camera assembly 300, a rear-facing camera assembly 400, a mainboard 500, a processor 600, a memory 700, and a battery 800. The display 200 is configured to display an image, and the display 200 may be further integrated with a touch function. The display 200 is mounted on the housing 100. The housing 100 may include a bezel 1001 and a rear cover 1002. The display 200 and the rear cover 1002 are respectively mounted on two sides opposite to each other of the bezel 1001. In this embodiment, space facing the display 200 is defined as the front of the electronic device 1000, and space facing the rear cover 1002 is defined as the rear of the electronic device 1000.

In some embodiments, the front-facing camera assembly 300 is located in the housing 100 and is located below the display 200. The display 200 is provided with a light transmitting part 2001, and the front-facing camera assembly 300 collects light from the front of the electronic device 1000 through the light transmitting part 2001, to implement photographing. The front-facing camera assembly 300 may include a camera module described in the following embodiments, or may include a camera module of another structure.

In some embodiments, at least one camera hole 1003 is disposed on the rear cover 1002. The rear-facing camera assembly 400 is located in the housing 100. The rear-facing camera assembly 400 collects light from the rear of the electronic device 1000 through the at least one camera hole 1003, to implement photographing. In embodiments of this application, "at least one" means one or more than one. The rear-facing camera assembly 400 includes at least one camera module 4001, for example, may include one or more of a standard camera module, a long-focus camera module, a wide-angle camera module, an ultra-long-focus camera module, or an ultra-wide-angle camera module. For example, the rear-facing camera assembly 400 includes a standard camera, a wide-angle camera, and a periscope long-focus camera. The camera module 4001 of the rear-facing camera assembly 400 may include a camera module described in the following embodiments, or may include a camera module of another structure.

In some embodiments, the rear-facing camera assembly 400 may further include a flash lamp module 4002. The rear cover 1002 is provided with a flash lamp hole 1004. The flash lamp module 4002 is located in the housing 100, and emits light through the flash lamp hole 1004.

In some embodiments, the mainboard 500 is located in the housing 100, and the processor 600 and the memory 700 are fastened to the mainboard 500. The display 200, the front-facing camera assembly 300, and the rear-facing camera assembly 400 are coupled to the processor 600. The memory 700 is configured to store computer program code. The computer program code includes computer instructions. The processor 600 is configured to invoke computer instructions to enable the electronic device 1000 to perform a corresponding operation, for example, enable the display 200 to display a target image, or enable the camera assembly 400 to collect the target image. The battery 800 is configured to supply power to the electronic device 1000.

Figure 3:
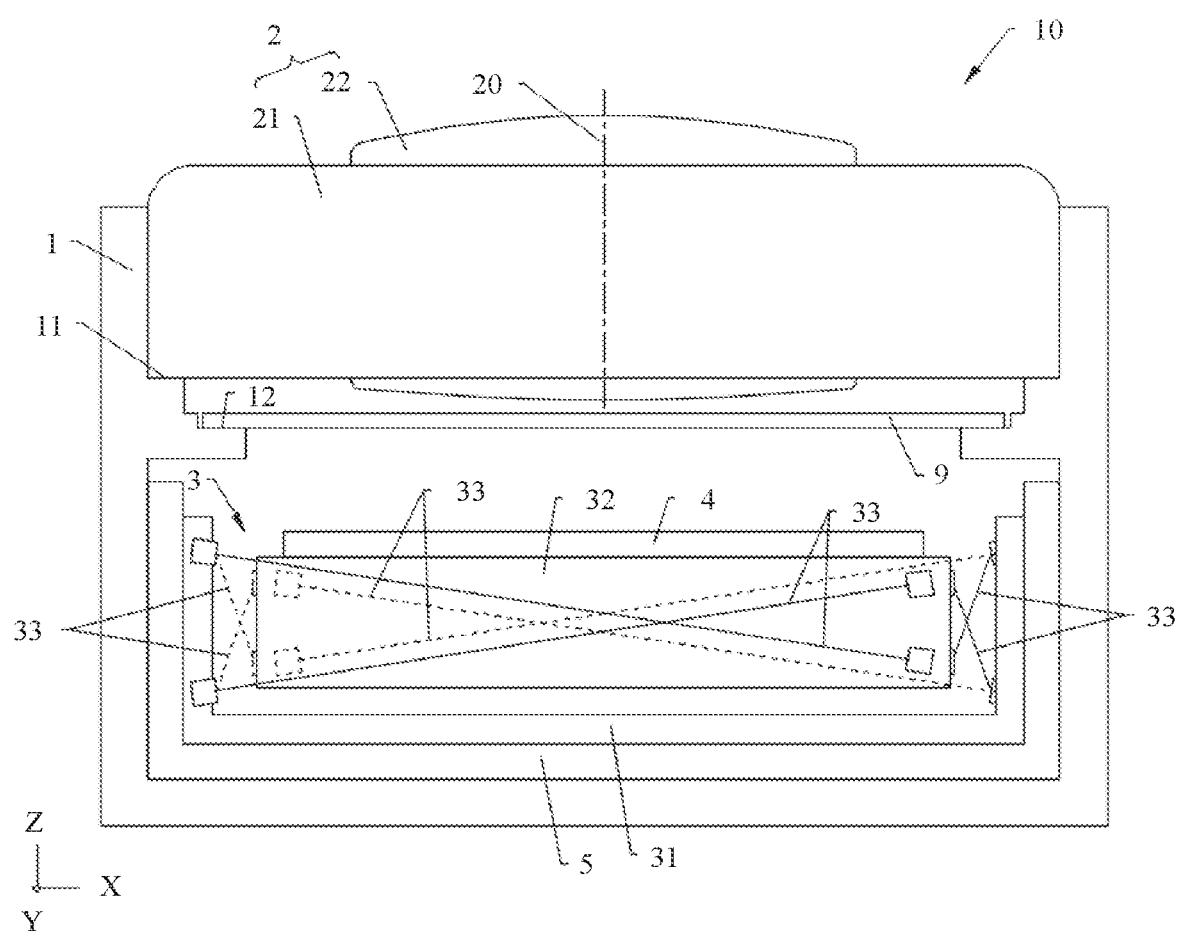
FIG. 3 is a schematic diagram of a structure of an electronic device in a first embodiment according to an embodiment of this application.

In some embodiments, the electronic device 1000 may further include one or more of function modules such as an antenna module, a mobile communication module, a sensor module, a motor, a microphone module, or a speaker module. The function module is coupled to the processor 600. The antenna module is configured to transmit and receive an electromagnetic wave signal. The antenna module may include a plurality of antennas, and each antenna may be configured to cover one or more communication frequency bands. Different antennas may be reused to improve utilization of the antennas. The mobile communication module may provide a solution applied to the electronic device 1000 for wireless communication such as 2G/3G/4G/5G. The sensor module may include one or more of a pressure sensor, a gyro sensor, a barometric pressure sensor, a magnetic sensor, an acceleration sensor, a distance sensor, an optical proximity sensor, a fingerprint sensor, a temperature sensor, a touch sensor, or an ambient light sensor. The motor may generate a vibration prompt. The motor may be used for an incoming call vibration prompt, or may be used for a touch vibration feedback. The microphone may be configured to convert a sound signal into an electrical signal. The speaker module is configured to convert an electrical signal into a sound signal, FIG. 3 is a schematic diagram of a structure of a camera module 10 in a first embodiment according to an embodiment of this application. For ease of description of the camera module 10 in the following, a width direction X of the camera module 10 is defined as a direction X shown in the figure. A length direction Y of the camera module 10 is defined as a direction Y shown in the figure. A thickness direction Z of the camera module 10 is defined as a direction Z shown in the figure. The width direction X, the length direction Y, and the thickness direction Z of the camera module 10 are perpendicular to each other.

The camera module 10 includes a module frame 1, a camera lens 2, an SMA motor 3, an image sensor 4, and a circuit board 5.

The module frame 1 is configured to fasten, support, and protect other components of the camera module 10. The module frame 1 includes a first supporting surface 11 and a second supporting surface 12, and the first supporting surface 11 and the second supporting surface 12 are located within the module frame 1. The module frame 1 may be an integrally formed structure, or an integrated structure formed by fastening a plurality of parts in an assembly manner (for example, bonding).

The camera lens 2 is mounted within the module frame I and fixedly connected to a frame module. Light enters the camera lens 2 from an in-light side of the camera lens 2, and is emitted from an out-light side of the camera lens 2. The camera lens 2 has a light convergence function. The camera lens 2 includes a lens tube 21 and at least one lens 22 fastened in the lens tube 21.

The lens tube 21 is fixedly connected to the module frame 1. For example, the lens tube 21 may be disposed to abut against the first supporting surface 11. In this embodiment, the lens tube 21 is fixedly connected to the module frame I with a simple connection relationship, so that the structure of the camera module 10 is simplified, costs of the camera module 10 are reduced, and miniaturization of the camera module 10 is implemented.

For example, there may be a plurality of lenses 22, and optical axes of the plurality of lenses 22 coincide to form the lenses into a lens group, so as to implement better optical performance. The lens group may include at least one convex lens and at least one concave lens. In some other embodiments, there may alternatively be one lens 22, to simplify a structure of the camera lens 2. In this case, the lens 22 may be a convex lens to converge light. A specific quantity and a combination manner of the lenses 22 are not strictly limited in embodiments of this application. An optical axis 20 of the camera lens 2 is an optical axis of the lens or the lens group. The thickness direction Z of the camera module 10 is parallel to the optical axis 20 of the camera lens 2.

The SMA motor 3 is mounted within the module frame 1 and is located on the out-light side of the camera lens 2. In the thickness direction Z of the camera module 10, the SMA motor 3 and the camera lees 2 are stacked with each other at intervals. The image sensor 4 is located between the camera lens 2 and the SMA motor 3 and is fastened to the SMA motor 3.

For example, the image sensor 4 may be fastened to the SMA motor 3 by bonding (for example, by glue dispensing). In another embodiment, the image sensor 4 may alternatively be fastened to the SMA motor 3 in another fastening manner such as soldering or snapping. The image sensor 4 converts an optical image on a light-sensitive surface of the image sensor 4 into an electrical signal in a corresponding proportion to the optical image by using an optical-to-electrical conversion function of an optoelectronic device. The light-sensitive surface of the image sensor 4 is disposed facing the camera lens 2. The image sensor 4 may be a charge coupled device (charge coupled device, CCD) or a complementary metal-oxide-semiconductor (complementary metal-oxide-semiconductor, CMOS) photoelectric transistor.

The SMA motor 3 is configured to actuate the image sensor 4 to shift in a direction parallel to the optical axis 20 of the camera lens 2. The SMA motor 3 is further configured to actuate the image sensor 4 to shift on a plane parallel to the optical axis 20 of the camera lens 2, and/or, actuate the image sensor 4 to rotate to tilt relative to the optical axis 20 of the camera lens 2. In this embodiment of this application, an example in which "the SMA motor 3 can actuate the image sensor 4 to shift on the plane perpendicular to the optical axis 20 of the camera lens 2, and can also actuate the image sensor 4 to rotate to tilt relative to the optical axis 20 of the camera lens 2" is used for description. The plane perpendicular to the optical axis 20 of the camera lens 2 of the camera module 10 is an XY plane of the camera module 10, that is, a plane on which the width direction X of the camera module 10 and the length direction Y of the camera module 10 are located.

Figure 4A:
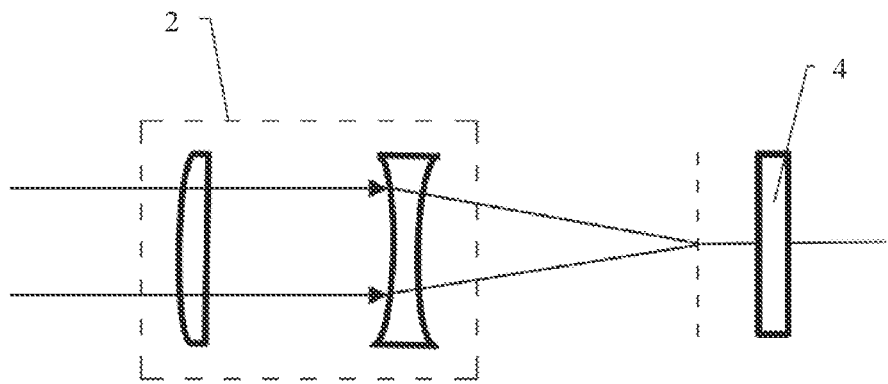
FIG. 4A is a schematic diagram of an initial optical path of the camera module shown in FIG. 3 in an environment with a blurred focus.
Figure 4B:
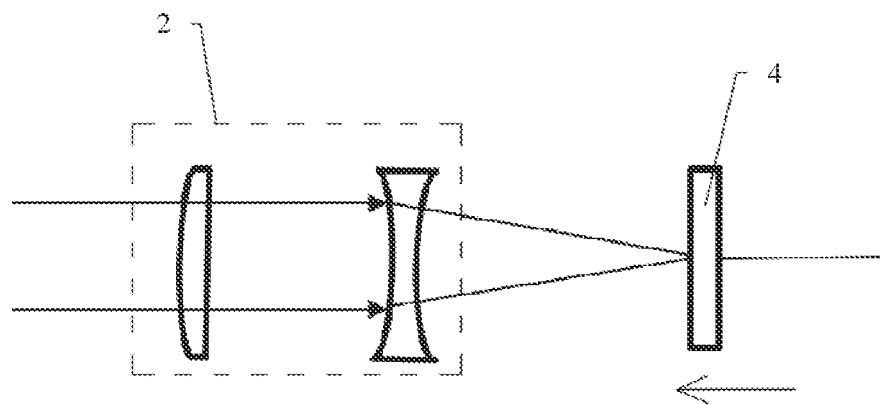
FIG. 4B is a schematic diagram of an optical path when the camera module shown in FIG. 3 implements auto focus.

FIG. 4A is a schematic diagram of an initial optical path of the camera module 10 shown in FIG. 3 in an environment with a blurred focus, and FIG. 413 is a schematic diagram of an optical path when the camera module 10 shown in FIG. 3 implements auto focus. FIG. 4A and FIG. 4B each show a structure including a convex lens and a concave lens of the camera lens 2.

As shown in FIG. 4A, when the camera module 10 performs focus with a blurred focus, an imaging focus generated after light passes through the camera lens 2 is offset. As a result, a focal plane is offset to cause a gap between the focal plane and the image sensor 4. As shown in FIG. 4B, because the SMA motor 3 can actuate the image sensor 4 to shift in a direction parallel to the optical axis 20 of the camera lens 2, the SMA motor 3 can actuate the image sensor 4 to shift from an original position in FIG. 4A to an adjusted position in FIG. 4B. In this way, the image sensor 4 implements focus compensation to enable a focal plane to coincide with a light-sensitive surface of the image sensor 4. Therefore, the camera module 10 can form a high-quality image and implement auto focus.

Figure 5A:
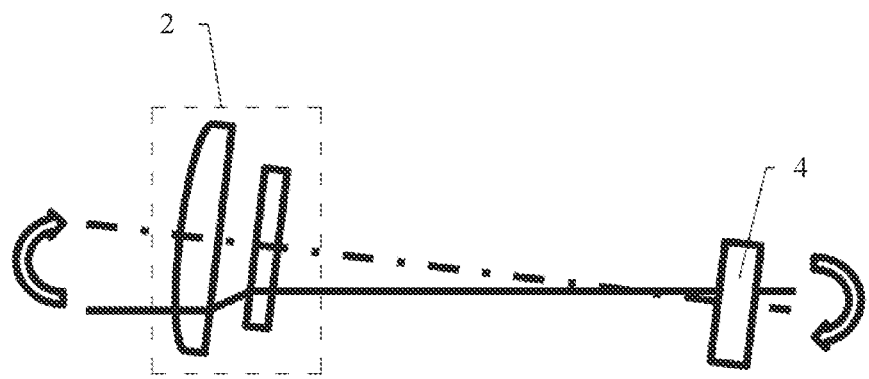
FIG. 5A is a schematic diagram of an initial optical path of the camera module shown in FIG. 3 in a jitter environment.
Figure 5B:
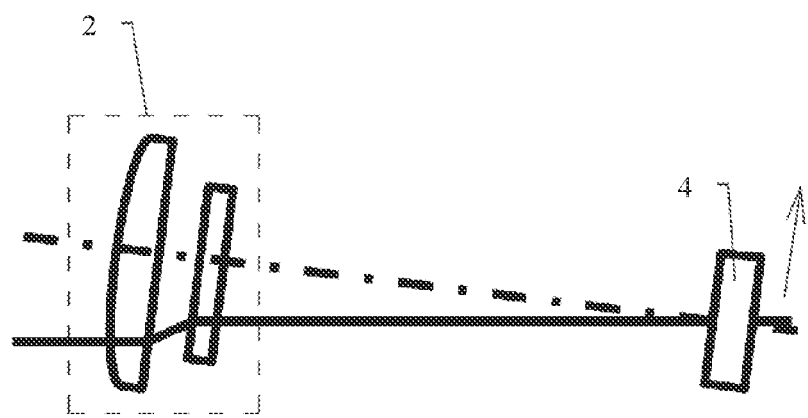
FIG. 5B is a schematic diagram of an optical path when the camera module shown in FIG. 3 implements optical image stabilization by shifting an image sensor.
Figure 5C:
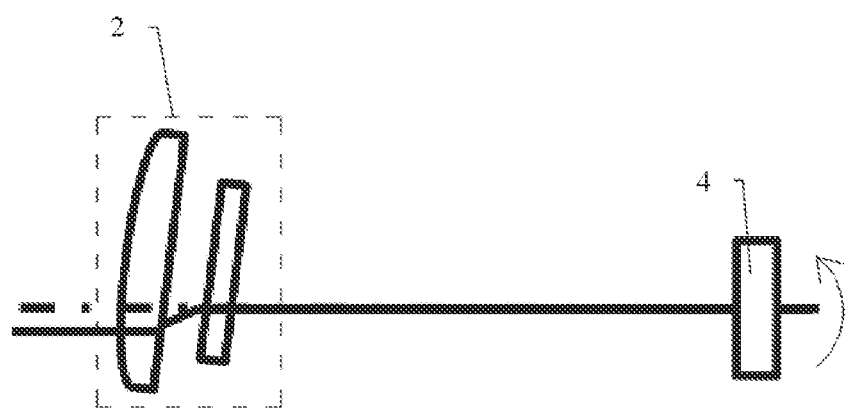
FIG. 5C is a schematic diagram of an optical path when the camera module shown in FIG. 3 implements optical image stabilization in an image sensor tilt manner.

FIG. 5A is a schematic diagram of an initial optical path of the camera module 10 shown in FIG. 3 in a jitter environment, FIG. 5B is a schematic diagram of an optical path when the camera module 10 shown in FIG. 3 implements optical image stabilization by shifting an image sensor, and FIG. 5C is a schematic diagram of an optical path when the camera module 10 shown in FIG. 3 implements optical image stabilization by tiling an image sensor. FIG. 5A to FIG. 5C each show a structure including a convex lens and a concave lens of the camera lens 2. In FIG. 5A to FIG. 5C, an actual optical path is shown by using a solid line, and an ideal optical path of the image sensor 4 is shown by using a dotted line.

As shown in FIG. 5A, when the camera module 10 jitters, an actual optical path formed after light passes through the camera lens 2 tilts to deviate from the ideal optical path of the image sensor 4. In this case, an imaging region of the actual optical path deviates from an ideal imaging region of the image sensor 4. As shown in FIG. 5B, because the SMA motor 3 can actuate the image sensor 4 to shift on a plane perpendicular to an optical axis 20 of the camera lens 2, the SMA motor 3 can actuate the image sensor 4 to shift from an original position in FIG. 5A to an adjusted position in FIG. 5B. In this way, the image sensor 4 implements jitter compensation, so that the imaging region of the actual optical path is transferred to the ideal imaging region. Therefore, the camera module 10 can form a high-quality image, thereby implementing optical image stabilization. As shown in FIG. 5C, because the SMA motor 3 can actuate the image sensor 4 to tilt relative to the optical axis 20 of the camera lens 2, the SMA motor 3 can actuate the image sensor 4 to rotate from the original position in FIG. 5A to an adjusted position in FIG. 5C. In this way, the image sensor 4 implements jitter compensation, and the actual optical path coincides with the ideal optical path of the image sensor 4, so that the imaging region of the actual optical path is transferred to the ideal imaging region. Therefore, the camera module 10 can form a high-quality image, thereby implementing optical image stabilization.

Compared with a conventional voice coil motor solution, this embodiment provides the camera module 10 that implements auto focus and optical image stabilization by shifting the SMA motor 3 and/or rotating the image sensor 4. An actuation load of the SMA motor 3 is greatly reduced, so that a power consumption of the SMA motor 3 is reduced. Therefore, a power consumption for the camera module 10 to implement auto focus and optical image stabilization is low. In addition, the camera module 10 further simplifies a motor structure to miniaturize the module, and implements both auto focus and image stabilization functions by using a non-electromagnetic force principle to eliminate magnetic interference.

In addition, due to a light convergence effect of the camera lens 2, compared with a conventional solution of shifting a camera lens to perform auto focus and optical image stabilization, this embodiment provides the camera module 10 that requires a shorter compensated distance and a smaller compensated angle to actuate the image sensor 4 to perform optical path compensation via the SMA motor 3. In this way, the power consumption of the SMA motor 3 is further reduced, so that the power consumption for the camera module 10 to implement auto focus and optical image stabilization is lower. In other words, under a same power consumption, the camera module 10 in this embodiment has better auto focus performance and better optical image stabilization performance than the conventional solution.

It may be understood that, in this embodiment, when same auto focus performance and same optical image stabilization performance are achieved, how much the compensated distance and the compensated angle of the image sensor 4 decrease by compared with a compensated distance and a compensated angle of a conventional camera lens is related to a lens structure 22 of the camera lens 2. An expected compensated distance range and an expected compensated angle range of the image sensor 4 may be obtained by optimizing the camera lens 2 structure, so that the camera module 10 has better performance, for example, a lower power consumption, a higher image stabilization feedback speed, and the like.

In some embodiments, the camera module 10 may feed back an actual location of the image sensor 4 during focus and image stabilization by using cable resistance of an SMA cable of the SMA motor 3, to implement a closed-loop control effect. Compared with a conventional solution, this embodiment needs no Hall sensor (Hall sensor) to be disposed. This simplifies a module structure and implements a better control effect.

Still refer to FIG. 3. The SMA motor 3 includes a motor frame 31, a carrier 32, and eight SMA cables 33. The motor frame 31 is fastened within the module frame 1. The carrier 32 is located within the motor frame 31. The image sensor 4 is fastened to a side of the carrier 32 facing the camera lens 2. The SMA cables 33 shrink when being electrified and heated.

The SMA cable 33 is made of a shape memory alloy (shape memory alloy. SMA) material, for example, a nickel-titanium alloy material. Shape memory alloys are a kind of metals with a shape memory effect. Generally, a metal material first has elastic deformation while being applied with an external three, and may be restored to its original shape after the external force is removed. If the external force continues to be applied, the metal material may have plastic deformation after reaching its yield point, and may not be restored to its original shape even though heated, as the plastic deformation is permanent after the external force is removed. The shape memory alloy is a kind of alloy material which can completely eliminate its deformation at a lower temperature and can be restored to its original shape after being heated. A basic working principle of a shape memory alloy material is to perform shape memory training (training) on the material by heating the material to a critical temperature and deforming the material to a specific extent. After a martensite phase is generated by cooling and then is heated to the critical temperature again, a low-temperature martensite phase is transformed into a high-temperature austenite phase through a reverse phase transformation (that is, a reverse phase change). In this way, the material is restored to what it was before deformation.

In this embodiment, heat generated when the SMA cables 33 are electrified leads to a temperature rise of the SMA cables 33, so that the low-temperature martensite phase is transformed into the high-temperature austenite phase through a reverse phase transformation. The SMA cables are restored to what they were before deformation. In this way, the SMA cables 33 shrink. When the SMA cables 33 are not electrified and are in a low-temperature martensite phase, the SMA cables may deform under external force. A length change due to shrinkage of the SMA cables 33 is essentially caused by a transformation between material crystal phase structures, to be specific, the transformation between martensite and austenite. Gravity generated due to a crystal structure change (that is, a gap change between atoms) between microscopic particles makes a pulling force generated when the macro SMA cables shrink 33 much greater than electromagnetic forces between common magnet coils. Therefore, the SMA cables 33 may shrink to actuate a heavier load, that is, may implement a large load. In this way, the SMA motor 3 can implement a large actuation force with a small size.

In this embodiment, the SMA cables 33 may shrink when being electrified and heated, to generate a corresponding pulling force on the carrier 32. The camera module 10 may control electrical signals in the eight SMA cables 33, so that the eight SMA cables apply a combined force to the carrier 32 in an expected direction. In this way, the carrier 32 together with the image sensor 4 is actuated to shift and/or rotate to an expected position in the expected direction, so that the camera module 10 may implement auto focus and image stabilization by shilling and/or rotating the image sensor 4.

As shown in FIG. 3, the circuit board 5 of the camera module 10 is located between the motor frame 31 and the module frame 1. The circuit board 5 is fixedly connected to the module frame 1. For example, a part of the circuit board 5 is fastened within the module frame 1, and a part (not shown in the figure) of the circuit board extends to the outside of the module frame 1.

The part that is of the circuit board 5 and that is located outside the module frame 1 may be electrically connected to the mainboard 500 of the electronic device 1000, so that the camera module 10 is coupled to the processor 600. The circuit board 5 is configured to transmit a control signal and an image signal of the camera module 10. For example, an electrical connector is disposed at an end of the circuit board 5 that is configured to connect to the mainboard 500. The electrical connector is connected to an electrical connector on the mainboard 500, so that the camera module 10 is electrically connected to a circuit and a component (for example, the processor 600) on the circuit board 5. The circuit board may be a soft-hard combination circuit board, or may be a flexible circuit board, or may be an integrated circuit board formed by connecting a rigid circuit board and a flexible circuit board. A specific architecture of the circuit board 5 is not limited in this application. The electrical connector on the circuit board 5 may be a board to board (board to board, BTB) connector or the like. In some other embodiments, coupling between the camera module 10, and the circuit and the component on the mainboard 500 may alternatively be implemented in a wireless connection manner.

For example, the camera module 10 may further include a camera driver chip, a motor driver chip, and related electronic components, and these components may be fastened to the circuit board 5. In some other embodiments, the camera driver chip and the motor driver chip may also be used as function modules and integrated into the processor 600 of the electronic device 1000. It may be understood that a drive circuit of the camera assembly 10 may also be implemented in another manner. This is not strictly limited in this application.

As shown in FIG. 3, for example, the motor frame 31 may be directly bonded to the circuit board 5, and the circuit board 5 may be configured to carry and fasten the SMA motor 3, so that the camera module 10 has high structural stability. In some other embodiments, the motor frame 31 may alternatively be fastened to the circuit board 5 in another manner such as clamping or soldering. A manner of connecting the motor frame 31 to the circuit board 5 is not strictly limited in embodiments of this application. For example, the motor frame 31 is in contact with the circuit board 5, and conduction between the motor frame 31 and the circuit board 5 may be implemented in a pin (pin) welding manner, an insert molding (insert molding) metal part welding manner, an electrically conductive silver adhesive bonding manner, or the like.

As shown in FIG. 3, in some embodiments, the camera module 10 may further include an IR cut filter (IR cut filter) 9. The IR cut filter 9 is mounted within the module frame 1 and located between the camera lens 2 and the image sensor 4. In the thickness direction Z of the camera module 10, the IR cut filter 9, the camera lens 2, and the image sensor 4 are stacked with each other at intervals. The IR cut filter 9 is configured to filter infrared light, to improve imaging quality of the camera module 10. For example, the IR cut filter 9 may be made of blue glass (blue glass). For example, the IR cut filter 9 may be disposed to abut against the second supporting surface 12. In some other embodiments, the IR cut filter 9 may alternatively not be disposed in the camera module 10.

Figure 6:
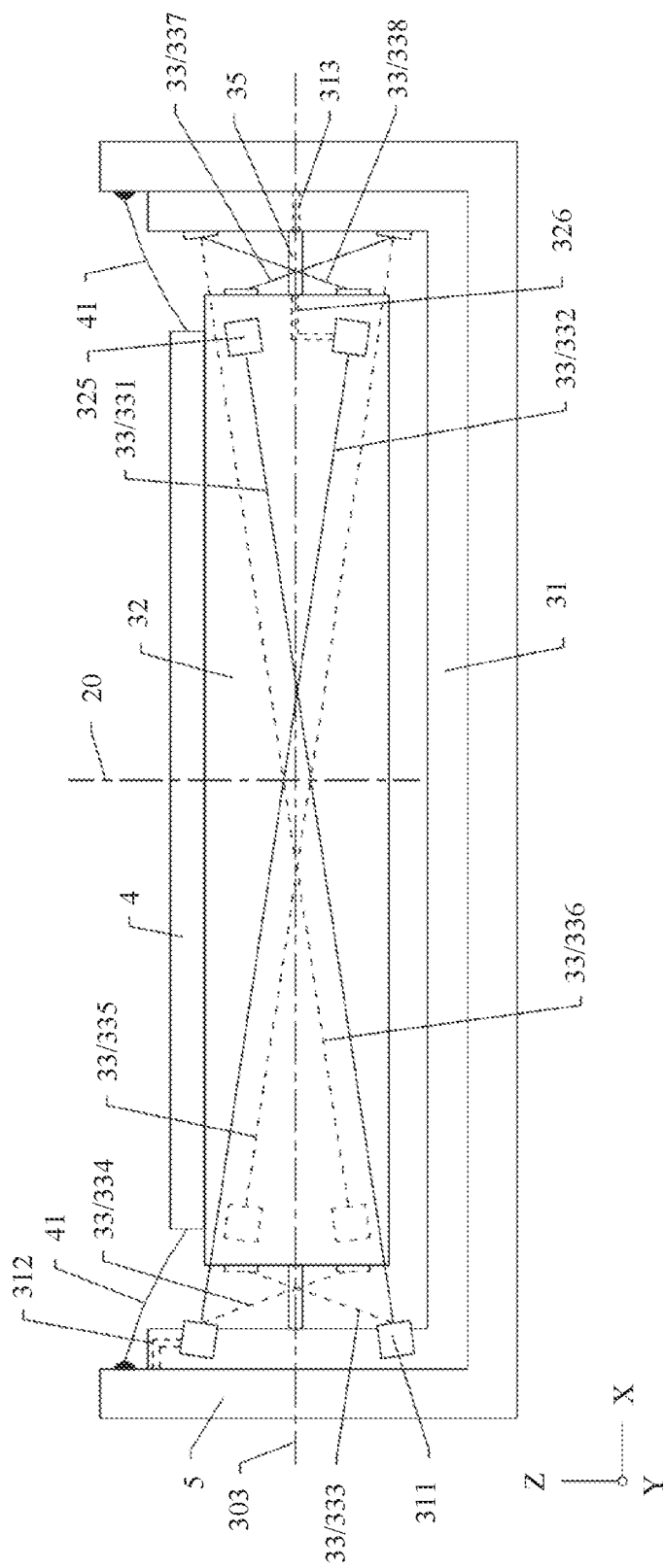
FIG. 6 is a schematic diagram of a partial structure of the camera module shown in FIG. 3 in some embodiments.
Figure 7:
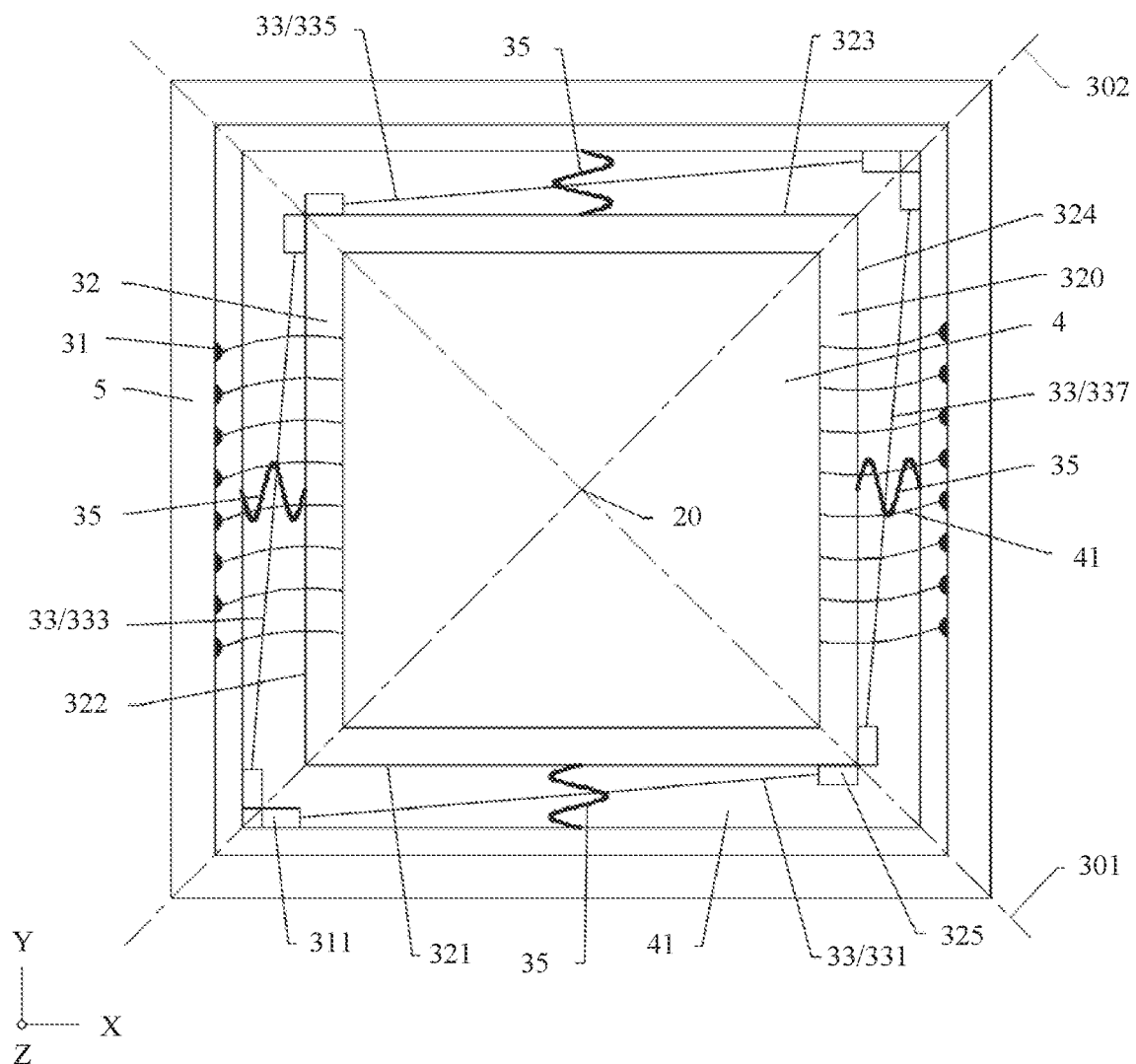
FIG. 7 is a schematic diagram of the structure shown in FIG. 6 from another angle.
Figure 8:
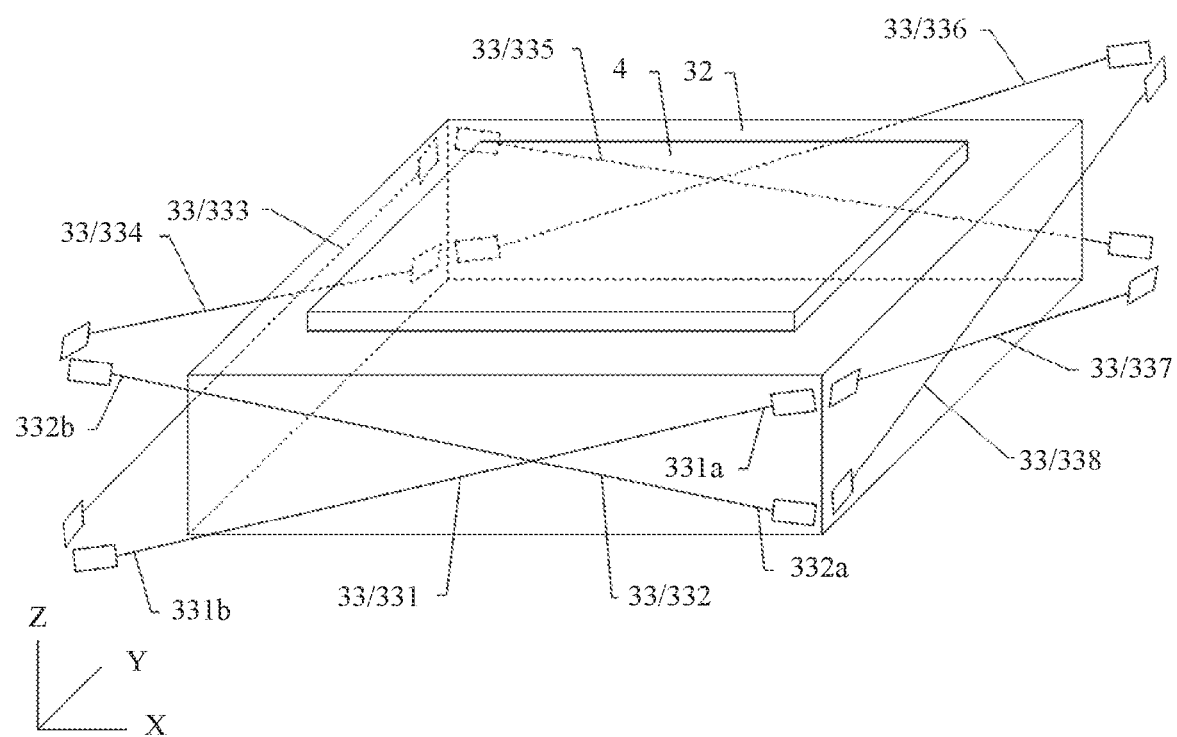
FIG. 8 is a schematic diagram of the partial structure shown in FIG. 6 from another angle.

Refer to FIG. 6 to FIG. 8 together. FIG. 6 is a schematic diagram of a partial structure of the camera module 10 shown in FIG. 3 in some embodiments, FIG. 7 is a schematic diagram of the structure shown in FIG. 6 from another angle, and FIG. 8 is a schematic diagram of the partial structure shown in FIG. 6 from another angle. FIG. 6 and FIG. 7 each show an image sensor 4, an SMA motor 3, and a circuit board 5 of a camera module 10, and FIG. 8 shows an image sensor 4, a carrier 32, eight SMA cables 33, and claws (311, 325) of the camera module 10.

The SMA motor 3 has a first reference plane 301, a second reference plane 302, and a third reference plane 303. Both the first reference plane 301 and the second reference plane 302 are traversed by an optical axis 20 of the camera lens 2, and the third reference plane. 303 is perpendicular to the optical axis 20 of the camera lens 2. In this case, the first reference plane 301 intersects with the second reference plane 302. For example, the first reference plane 301, the second reference plane 302, and the third reference plane 303 are perpendicular to each other. The first reference plane 301 rotates clockwise by 45° around the optical axis 20 of the camera lens 2 relative to an XZ plane of the camera module 10. The second reference plane 302 rotates clockwise by 45° around the optical axis 20 of the camera lens 2 relative to a. YZ plane of the camera module 10. The third reference plane 303 is parallel to an XY plane of the camera module 10. In another embodiment, an angle between the first reference plane 301 and the second reference plane 302 may also be another angle.

One end of each SMA cable 33 is fastened to the carrier 32, and the other end of the SMA cable 33 is fastened to the motor frame 31. The eight SMA cables 33 are disposed in pairs. For example, the eight SMA cables 33 include a first SMA cable 331, a second SMA cable 332, a third SMA cable 333, a fourth SMA cable 334, a fifth SMA cable 335, a sixth SMA cable 336, a seventh SMA cable 337, and an eighth SMA cable 338. The first SMA cable 331 and the second SMA cable 332 are disposed as a first pair, the third SMA cable 333 and the fourth SMA cable 334 are disposed as a second pair, the fifth SMA cable 335 and the sixth SMA cable 336 are disposed as a third pair, and the seventh SMA cable 337 and the eighth SMA cable 338 are disposed as a fourth pair. In FIG. 6, solid lines are used to indicate two pairs of SMA cables 33 in front positions from a current viewing angle, and dotted lines are used to indicate two pairs of SMA cables 33 in back positions from the current viewing angle. FIG. 7 shows one SMA cable 33 in each pair of SMA cables 33.

For example, the carrier 32 is approximately shaped as a rectangular plate. The carrier 32 includes an upper plate surface 320 facing the image sensor 4 and peripheral sides connected to peripheral edges of the upper plate surface 320. The image sensor 4 is fastened on the upper plate surface 320 of the carrier 32. The peripheral sides include a first side 321, a second side 322, a third side 323, and a fourth side 324 that are connected in sequence. The first side 321 and the second side 322 are symmetrically disposed relative to the second reference plane 302. The third side 323 and the second side 322 are symmetrically disposed relative to the first reference plane 301. The fourth side 324 and the third side 323 are symmetrically disposed relative to the second reference plane 302. The first side 321 and the fourth side 324 are symmetrically disposed relative to the first reference plane 301. In some other embodiments, the carrier 32 may alternatively have another shape, for example, a rounded rectangular plate shape or a circular plate shape. It may be understood that each side of the peripheral sides of the carrier 32 adaptively changes with a shape of the carrier 32.

Each SMA cable 33 includes a movable end and a fixed end. The movable ends of the four pairs of SMA cables 33 are respectively fastened to four sides of the carrier 32, and the fixed ends of the four pairs of SMA cables 33 are respectively fastened in different positions of the motor frame 31. In other words, ends of the four pairs of SMA cables 33 are fastened to the four sides of the carrier 32, and the other ends of the four pairs of SMA cables 33 are fastened in the different positions of the motor frame 31. Two pairs of SMA cables 33 and the other two pairs of SMA cables 33 are symmetrically disposed relative to the first reference plane 301, two pairs of SMA cables 33 located on a same side of the first reference plane 301 are symmetrically disposed relative to the second reference plane 302, and two SMA cables 33 of a same pair are symmetrically disposed relative to the third reference plane 303. For example, the first pair of SMA cables and the second pair of SMA cables, and the third pair of SMA cables and the fourth pair of SMA cables are symmetrically disposed relative to the first reference plane 301. The first pair of SMA cables and the second pair of SMA cables are symmetrically disposed relative to the second reference plane 302. The first SMA cable 331 of the first pair of SMA cables and the second SMA cable 332 are symmetrically disposed relative to the third reference plane 303.

In this embodiment, a position relationship among the eight SMA cables 33 is limited, so that the camera module 10 can control the combined force applied by the eight SMA cables 33 to the carrier 32 to actuate the carrier 32 to shift along the first reference plane 301, shill along the second reference plane 302, shill in a direction parallel to the optical axis 20 of the camera lens 2, and rotate to tilt relative to the optical axis 20 of the camera lens 2 by controlling the electrical signals in the eight SMA cables 33. Therefore, the carrier 32 has a triaxial shill degree of freedom and a rotation degree of freedom when actuated by the eight SMA cables 33. The carrier 32 together with the image sensor 4 can shift and/or rotate to any position in an XY plane within a stroke range of the carrier, to implement auto focus and optical image stabilization of the image sensor 4.

For example, one end of the SMA cable 33 may be fastened to the motor frame 31 through a fixed clamping jaw 311. The other end of the SMA cable 33 may be fastened to the carrier 32 through a movable clamping, jaw 325. The fixed clamping jaws 311 and the movable clamping jaws 325 may be made of a conductive material or form a conductive structure, so that the SMA cables 33 are electrically connected to the carrier 32 and the motor frame 31.

It can be understood that, the eight SMA cables 33 of the camera module 10 may have a plurality of specific connection manners to meet the foregoing position relationship requirements. This embodiment takes one of the connection manners as an example for description.

As shown in FIG. 8, both a movable end 331a of the first SMA cable 331 and a movable end 332a of the second SMA cable 332 are fastened to an end of the first side 321 close to the second side 322, a fixed end 331b of the first SMA cable 331 is close to the second side 322 relative to the movable end 331a of the first SMA cable 331, and a fixed end 332b of the second SMA cable 332 is close to the second side 322 relative to the movable end 332a of the second SMA cable 332.

As shown in FIG. 6 to FIG. 8, the first SMA cable 331 intersects with the second SMA cable 332, and the first SMA cable 331 and the second SMA cable 332 are symmetrically disposed relative to the third reference plane 303. The third SMA cable 333 and the first SMA cable 331 are symmetrically disposed relative to the second reference plane 302, and the fourth SMA cable 334 and the second. SMA cable 332 are symmetrically disposed relative to the second reference plane 302. The fifth SMA cable 335 and the third SMA cable 333 are symmetrically disposed relative to the first reference plane 301, and the sixth SMA cable 336 and the fourth SMA cable 334 are symmetrically disposed relative to the first reference plane 301. The seventh SMA cable 337 and the fifth SMA cable 335 are symmetrically disposed relative to the second reference plane 302, and the eighth SMA cable 338 and the sixth SMA cable 336 are symmetrically disposed relative to the second reference plane 302.

In this embodiment, one end of each of the SMA cables 33 is fastened at a diagonal position of the carrier 32, and the other end is fastened at a diagonal position of the motor frame 31, so that the SMA cable 33 can have a sufficient length when space in the SMA motor 3 is limited. In this way, the SMA cable has a sufficient amount of expansion, so that the SMA motor 3 may have a larger actuation stroke range to lead to a better image stabilization performance of the camera module 10.

A process in which the SMA motor 3 actuates the image sensor 4 to shift is described below as an example with reference to FIG. 9 and FIG. 10.

Figure 9:
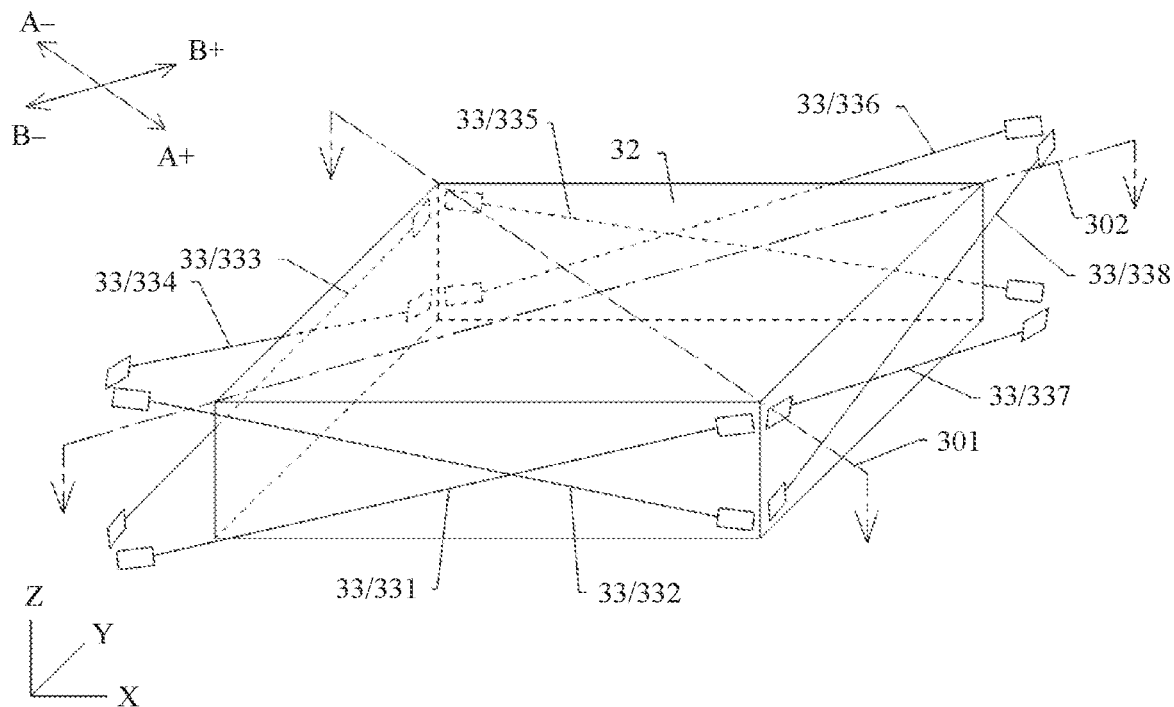
FIG. 9 is a schematic diagram of a structure in which the SMA motor shown in FIG. 6 actuates the image sensor shown in FIG. 6 to implement sensor-shift image stabilization.

FIG. 9 is a schematic diagram of a structure in which the SMA motor 3 shown in FIG. 6 actuates the image sensor 4 shown in FIG. 6 to implement sensor-shift image stabilization. It is shown that two directions of the first reference plane 301 away from the second reference plane 302 are respectively an A+ direction and an A− direction. Two directions of the second reference plane 302 away from the first reference plane 301 are respectively a B+ direction and a B− direction.

The eight SMA cables 33 are all electrified. The first SMA cable 331 generates a pulling force F1. The second SMA cable 332 generates a pulling force F2. The third SMA cable 333 generates a pulling force F3. The fourth SMA cable 334 generates a pulling force F4. The fifth SMA cable 335 generates a pulling force F5. The sixth SMA cable 336 generates a pulling force F6. The seventh SMA cable 337 generates a pulling force F7. The eighth SMA cable 338 generates a pulling force F8. When F1+F2+F7+F8>F3+F4+F5+F6, the carrier 32 together with the image sensor 4 shifts in the A+ direction. When F1+F2+F7+F8<F3+F4+F5+F6, the carrier 32 together with the image sensor 4 shifts in the A− direction. When F1+F2+F3+F4>F5+F6+F7+F8, the carrier 32 together with the image sensor 4 shifts in the B− direction. When F1+F2+F3+F4<F5+F6+F7+F8, the carrier 32 together with the image sensor 4 shifts in the B+ direction. When acting forces of the eight SMA cables 33 are balanced, the carrier 32 and the image sensor 4 are in a stable state.

Figure 10:
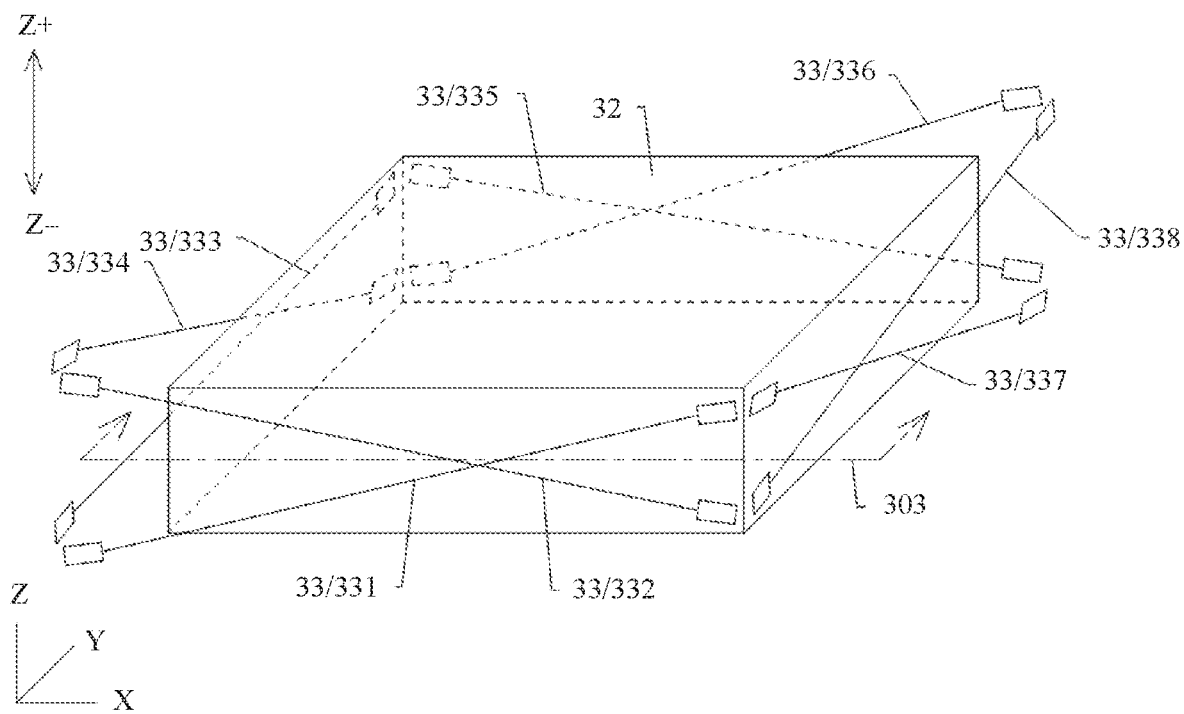
FIG. 10 is a schematic diagram of a structure in which the SMA motor shown in FIG. 6 actuates the image sensor shown in FIG. 6 to implement auto focus.

FIG. 10 is a schematic diagram of a structure in which the SMA motor 3 shown in FIG. 6 actuates the image sensor 4 shown in FIG. 6 to implement auto focus. Two directions perpendicular to the third reference plane 303 are respectively a Z+ direction and a Z− direction.

The eight SMA cables 33 are all electrified. The first SMA cable 331 generates a pulling force F1. The second SMA cable 332 generates a pulling force F2. The third SMA cable 333 generates a pulling force F3. The fourth SMA cable 334 generates a pulling force F4. The fifth SMA cable 335 generates a pulling force F5. The sixth SMA cable 336 generates a pulling force F6. The seventh SMA cable 337 generates a pulling force F7. The eighth SMA cable 338 generates a pulling force F8. Total gravity of the image sensor 4 and the carrier 32 is G. When F1+F3+F5+F7>F2+F4 F6+F8+G, the carrier 32 together with the image sensor 4 shifts in the Z-F direction. When F1+F3+F5+F7<F2+F4+F6+F8+G, the carrier 32 together with the image sensor 4 shifts in the Z-direction. When acting forces of the eight SMA cables 33 and the gravity of the image sensor 4 and the carrier 32 are balanced, the carrier 32 and the image sensor 4 are in a stable state.

It may be understood that, in some embodiments, the camera module 10 may further control electrical signals of the eight SMA cables, so that the carrier 32 carries the image sensor 4 to implement tilt (tilt) image stabilization.

Figure 11:
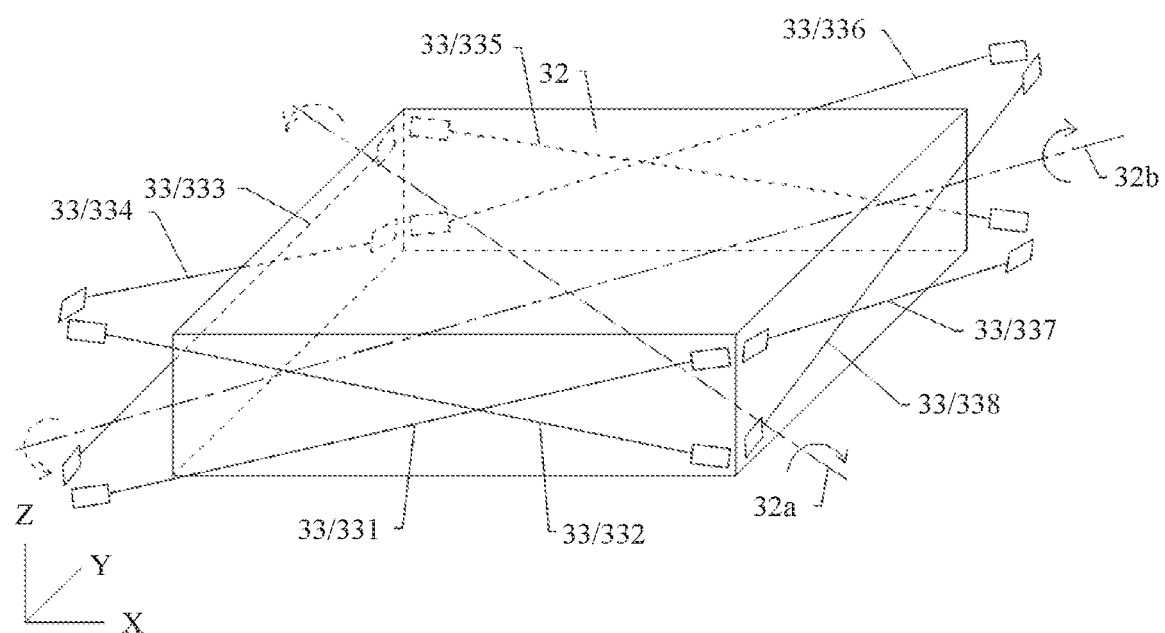
FIG. 11 is a schematic diagram of a structure in which the SMA motor shown in FIG. 6 actuates the image sensor shown in FIG. 6 to implement tilt image stabilization.

FIG. 11 is a schematic diagram of a structure in which the SMA motor 3 shown in FIG. 6 actuates the image sensor 4 shown in FIG. 6 to implement tilt image stabilization. The carrier 32 has a first rotation axis 32a and a second rotation axis 32b, and the second rotation axis 32b intersects with the first rotation axis 32a. The first rotation axis 32a is an intersection line between the first reference plane 301 and the third reference plane 303, and the second rotation axis 32b is an intersection line between the second reference plane 302 and the third reference plane 303. Two directions perpendicular to the third reference plane 303 are respectively a Z+ direction and a Z− direction.

The eight SMA cables 33 are all electrified. The first SMA cable 331 generates a pulling force F1. The second SMA cable 332 generates a pulling force F2. The third SMA cable 333 generates a pulling force F3. The fourth SMA cable 334 generates a pulling force F4. The fifth SMA cable 335 generates a pulling force F5. The sixth SMA cable 336 generates a pulling force F6. The seventh SMA cable 337 generates a pulling force F7. The eighth SMA cable 338 generates a pulling force F8. When F2+F4+F5+F7>F1+F3+F6+F8, the carrier 32 together with the image sensor 4 rotates clockwise around the first rotation axis 32a (as indicated by a solid-line arrow). When F2+F4+F5+F7<F1+F3+F6+F8, the carrier 32 together with the image sensor 4 rotates clockwise around the second rotation axis 32b (as indicated by a solid-line arrow). When F2+F3+F5+F8>F1+F4+F6+F7, the carrier 32 together with the image sensor 4 rotates clockwise around the second rotation axis 32b (as indicated by a solid-line arrow). When F2+F3+F5+F8<F1+F4+F6+F7, the carrier 32 together with the image sensor 4 rotates anticlockwise around the second rotation axis 32b (as indicated by a dashed-line arrow). When acting forces of the eight SMA cables 33 are balanced, the carrier 32 and the image sensor 4 are in a stable state.

In this embodiment, the camera module 10 may implement image stabilization by shifting the image sensor 4, or may implement image stabilization by tilting the image sensor 4, or may implement image stabilization by combining the two methods.

It may be understood that the SMA motor 3 may simultaneously implement the auto focus function and the optical image stabilization function by controlling the eight SMA cables 33. Therefore, a stroke capacity of the auto focus function is associated with a stroke capacity of the optical image stabilization function.

Figure 12:
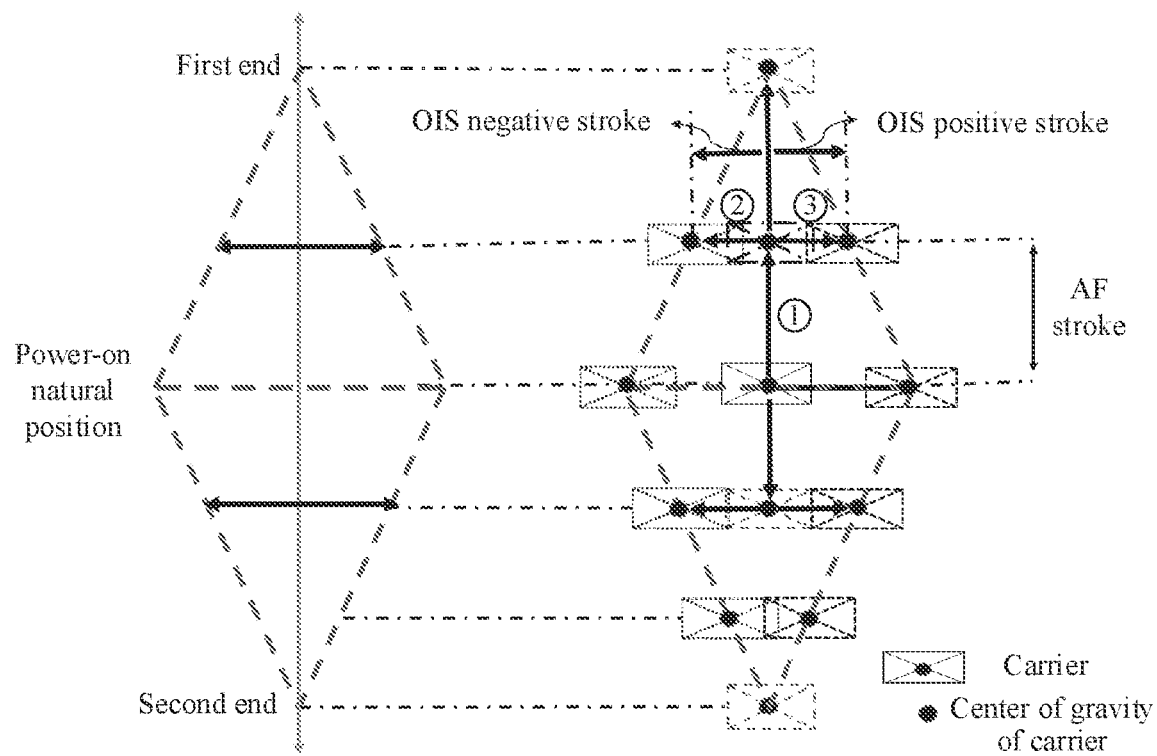
FIG. 12 is a characteristic diagram of a stroke capacity of an auto focus function and a stroke capacity of an optical image stabilization function of the SMA motor shown in FIG. 6.

FIG. 12 is a characteristic diagram of a stroke capacity of an auto focus function and a stroke capacity of an optical image stabilization function of the SMA motor 3 shown in FIG. 6. In FIG. 12, a rectangular box represents a carrier 32, and a black dot represents a center of gravity of the carrier 32.

When a maximum shrinkage rate of a single SMA cable 33 that is powered on is kept unchanged, that is, when a cable length of the SMA cable 33 that is powered off is constant, a maximum shrinkable length of the SMA cable 33 is constant. When the SMA cable 33 shrinks upon power-on, a shifting distance of the carrier 32 is proportional to a shrinkage length of the SMA cable 33. When the maximum shrinkage rate of each SMA cable 33 is constant (that is, a driving electrical signal is constant), it is assumed that the maximum shrinkage length is L. When the center of gravity of the carrier 32 shifts for a certain distance in the vertical direction (that is, an auto focus stroke is generated, as shown in a process 1 in the figure), a part of the shrinkage length L1 of the SMA cable 33 is already consumed. On this basis, if the center of gravity of the carrier 32 shifts in the horizontal direction (that is, an optical image stabilization stroke is generated, as shown in processes 2 and 3 in the figure), a remaining maximum shrinkage cable length left in the horizontal direction is L-L1. When L1 is small, L-L1 is large. When L1 is large, L-L1 is small. To be specific, when the auto focus stroke is larger, the optical image stabilization stroke is smaller. When the carrier 32 is in a power-on natural position and uses the power-on natural position as a reference surface, there is no auto focus stroke, and a corresponding optical image stabilization stroke is maximum. When the carrier 32 is at the first end or the second end, the auto focus stroke is maximum, and a corresponding optical image stabilization stroke is 0. For another example, the carrier 32 is rectangular, and an included angle between two SMA cables 33 in a same pair is less than 45°. Therefore, for a same shrinkage length, a shrinkage length obtained through splitting in the vertical direction is greater than a shrinkage length in the horizontal direction. In other words, an auto focus stroke is greater than an optical image stabilization stroke. In this way, the auto focus stroke and the optical image stabilization stroke may coexist, with a symmetric diamond-shaped relationship shown in FIG. 12.

It can be imagined that, when the center of gravity of the carrier 32 is controlled to only shift in the vertical direction, to not shift in the horizontal direction, the maximum shrinkage cable length is all used for shrinkage in the vertical direction. Therefore, the shift in the vertical direction may reach the maximum, that is, the auto focus stroke may reach the maximum. In other words, if there is no requirement for an optical image stabilization effect, the auto focus stroke may be maximized. Similarly, when a large auto focus stroke is not required, a larger optical image stabilization stroke (for example, a front-facing camera) may be implemented. Generally, when an included angle and a cable length of two crossed SMA cables 33 (for example, the first SMA cable 331 and the second SMA cable 332) are determined, and a maximum shrinkage rate of the cable length is constant, a maximum auto focus stroke and a maximum optical image stabilization stroke even correspond to a specific vertical distance, that is, a specific auto focus stroke. In this case, the maximum optical image stabilization stroke is also determined.

Therefore, when the length and the included angles of the SMA cables 33 are determined, the camera module 10 may highlight an auto focus stroke capacity based on an actual requirement, to reach an auto focus stroke more than 800 µm, and to have an excellent auto focus performance capability, may highlight an optical image stabilization stroke, or may integrate both optical image stabilization performance and auto focus performance.

Refer to FIG. 6 and FIG. 7 again. In some embodiments, the image sensor 4 may be electrically connected to the circuit board 5 through a plurality of bonding wires 41 (bonding wires). The bonding wires 41 may be gold wires or the like. Each bonding wire 41 is long. When the image sensor 4 shifts and/or rotates together with the carrier 32 relative to the motor frame 31, the image sensor 4 shifts and/or rotates relative to the circuit board 5, and the bonding wires 41 are adaptively deformed with a shift and/or rotation of the image sensor 4. When the bonding wires 41 are long, the wires are easily deformed and are unlikely to break. Therefore, the bonding wires 41 are highly reliable, and a service life of the camera module 10 is long.

For example, the image sensor 4 is electrically connected to the circuit board 5 through two groups of symmetrically disposed bonding wires 41. The carrier 32 and the motor frame 31 are traversed by the bonding wires 41. In some other embodiments, there may alternatively be another quantity of groups of the bonding wires 41, for example, four groups. The symmetrically disposed bonding wires 41 help balancing a force applied to the image sensor 4 in a shifting and/rotation process of the image sensor 4, so that the camera module 10 has better auto focus performance and better optical image stabilization performance. A plurality of groups of bonding wires 41 may back up each other. In some other embodiments, there may alternatively be one or three groups of bonding wires 41, or the like.

In some embodiments, a first electric-conductor 326 is disposed on the carrier 32, a second electric-conductor 312 is disposed on the motor frame 31, and the SMA motor 3 further includes a conductive connecting piece 35. The second electric-conductor 312 electrically connects the circuit board 5 to the fixed end of the SMA cable 33, and the movable end of the SMA cable 33 is electrically connected to the first electric-conductor 326. The conductive connecting piece 35 electrically connects the first electric-conductor 326 to the circuit board 5.

In this embodiment, the circuit board 5, the second electric-conductor 312, the SMA cable 33, the first electric-conductor 326, and the conductive connecting piece 35 form a loop. The circuit board 5 can supply power to the SMA cable 33, so as to control a shrinkage status of the SMA cable 33 through an electrical signal.

For example, the conductive connecting piece 35 is a spring, and the conductive connecting piece 35 is located between the carrier 32 and the motor frame 31. The motor frame 31 further includes a third electric-conductor 313, and the third electric-conductor 313 electrically connects the conductive connecting piece 35 to the circuit board 5.

In this embodiment, the spring, as the conductive connecting piece 35 cannot only achieve an electrical connection function, but also balance and buffer a force applied to the carrier 32 when the SMA cables 33 are electrified to actuate the carrier 32 to shift or rotate together with the image sensor 4, which makes the carrier 32 shift or rotate more stably. In addition, when the SMA cables 33 are powered off, the spring can actuate the carrier 32 together with the image sensor 4 to shift or rotate back to an initial position by using an elastic force generated by deformation when the SMA cables 33 are electrified to actuate the carrier 32 to shift or rotate.

It should be noted that, the camera module 10 inputs different electrical signals to different SMA cables 33, so that the different SMA cables 33 can shrink independently of each other. In some embodiments, channels corresponding to the different SMA cables 33 are independent of each other. For example, there are eight first electric-conductors 326, eight second electric-conductors 312, and eight conductive connecting pieces 35. One second electric-conductor 312, one SMA cable 33, one first electric-conductor 326, one conductive connecting piece 35, and one third electric-conductor 313 form one channel, so that the SMA motor 3 forms eight channels independent of each other. In some other embodiments, the channels corresponding to the different SMA cables 33 are partially shared, to simplify a circuit structure. For example, there are eight second electric-conductors 312, one first electric-conductor 326, one conductive connecting piece 35, and one third electric-conductor 313. Each of the eight second electric-conductors 312 is respectively connected to one end of each of the eight SMA cables 33, and the other end of each of the eight SMA cables 33 is connected to the first electric-conductor 326 and the conductive connecting piece 35. In this embodiment, channels of different SMA cables 33 have different positive inputs and a same negative output, and the channels of the different SMA cables 33 may still input different electrical signals.

The first electric-conductor 326, the second electric-conductor 312 and the third electric-conductor 313 each may have a plurality of implementation structures, including but are not limited to a conducting wire, a conductive patch, a conductive mechanical part, or the like. For example, the first electric-conductor 326 may be a part of a circuit of the carrier 32, and the second electric-conductor 312 and the third electric-conductor 313 each may be a part of a circuit of the motor frame 31. Each electric-conductor may be formed by electroplating, or may be formed by bonding a flexible circuit board, or may be formed by embedding metal through insert molding (insert molding). This is not strictly limited in this application.

Figure 13:
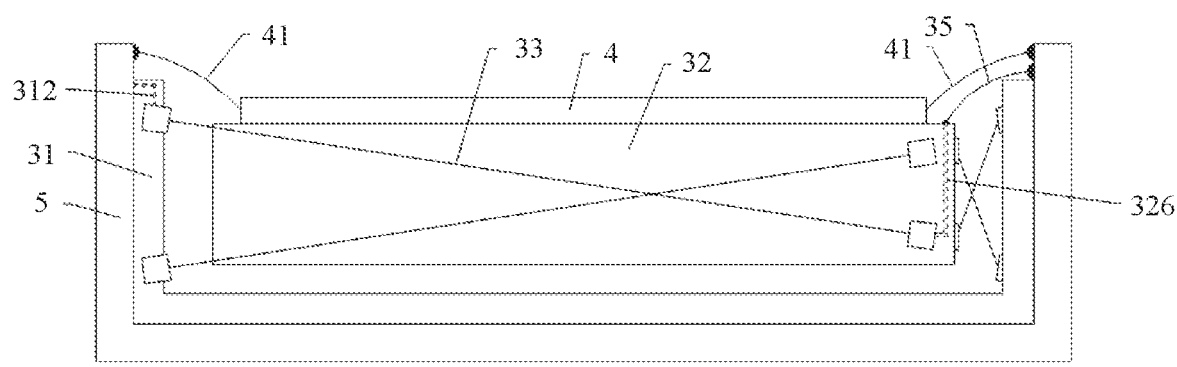
FIG. 13 is a schematic diagram of a partial structure of the camera module shown in FIG. 3 in some other embodiments.
Figure 14:
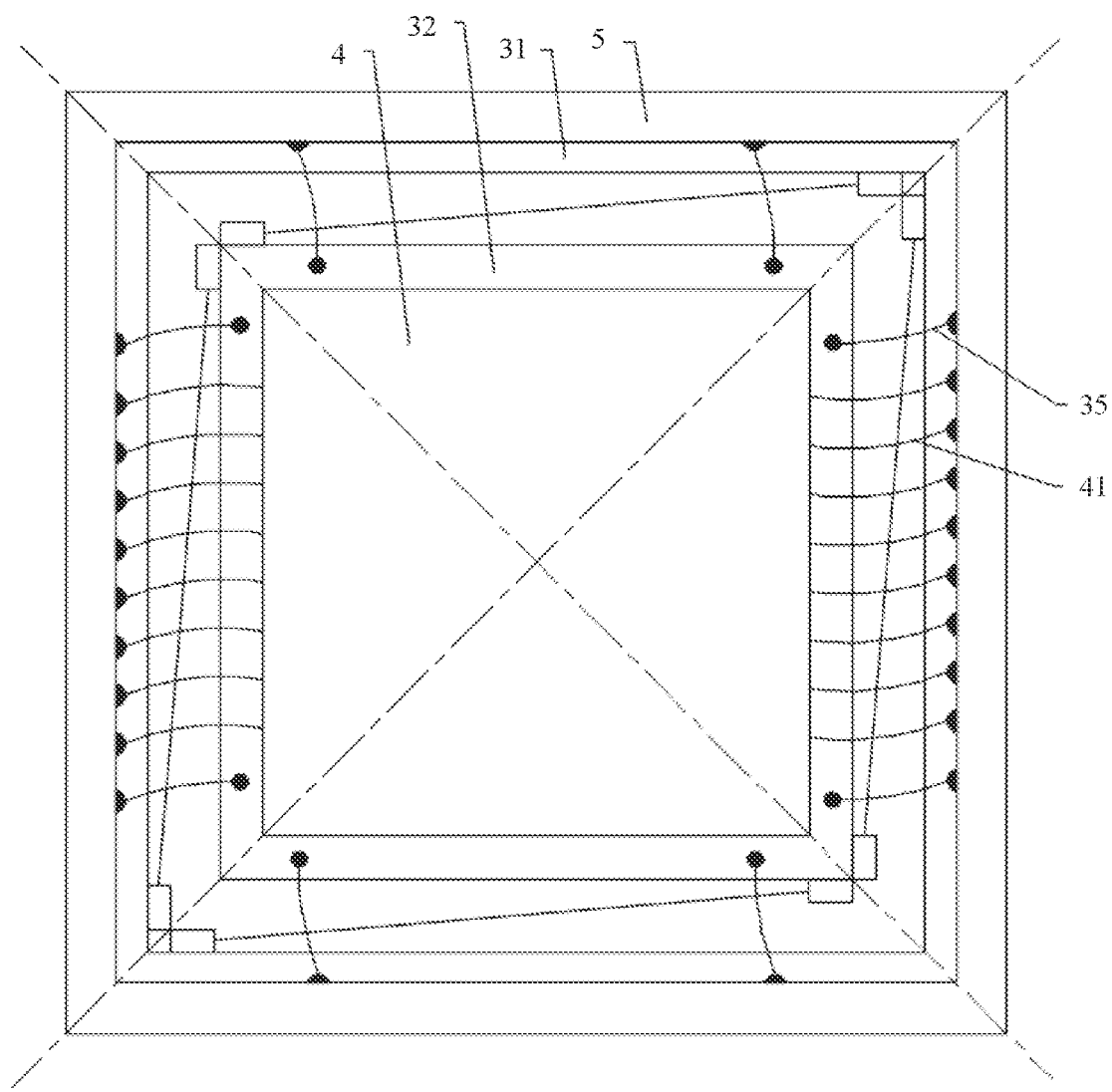
FIG. 14 is a schematic diagram of the structure shown in FIG. 13 from another angle.

Refer to FIG. 13 and FIG. 14 together. FIG. 13 is a schematic diagram of a partial structure of the camera module 10 shown in FIG. 3 in some other embodiments, and FIG. 14 is a schematic diagram of the structure shown in FIG. 13 from another angle. FIG. 13 and FIG. 14 show the image sensor 4, the SMA motor 3, and the circuit board 5 of the camera module 10. Some SMA cables 33 are omitted in FIG. 13 and FIG. 14. The following mainly describes differences between this embodiment and the foregoing embodiments, and most content of this embodiment that is the same as the content of the foregoing embodiments is not described again.

The image sensor 4 is electrically connected to the circuit board 5 through a plurality of bonding wires 41. A first electric-conductor 326 is disposed on the carrier 32, a second electric-conductor 312 is disposed on the motor frame 31, and the SMA motor 3 further includes a conductive connecting piece 35. The second electric-conductor 312 electrically connects the circuit board 5 to the fixed end of the SMA cable 33, and the movable end of the SMA cable 33 is electrically connected to the first electric-conductor 326. The conductive connecting piece 35 electrically connects the first electric-conductor 326 to the circuit board 5. The conductive connecting piece 35 is a conducting wire, and the conductive connecting piece 35 is connected to the circuit board 5.

In this embodiment, the carrier 32 is directly connected to the circuit board 5 through the conductive connecting piece 35 of the conducting wire structure, so that a transmission path through the motor frame 31 can be omitted. This simplifies a circuit structure of the SMA motor 3. For example, there may be one or more conducting wires. When a plurality of conducting wires are designed, the plurality of conducting wires are divided into a plurality of groups, and the plurality of groups of conducting wires are symmetrically arranged. 1001321 it may be understood that, in this embodiment, a spring connecting the carrier 32 to the motor frame 31 may also be disposed on the SMA motor 3, and the spring is configured to implement a structure support function.

Figure 15:
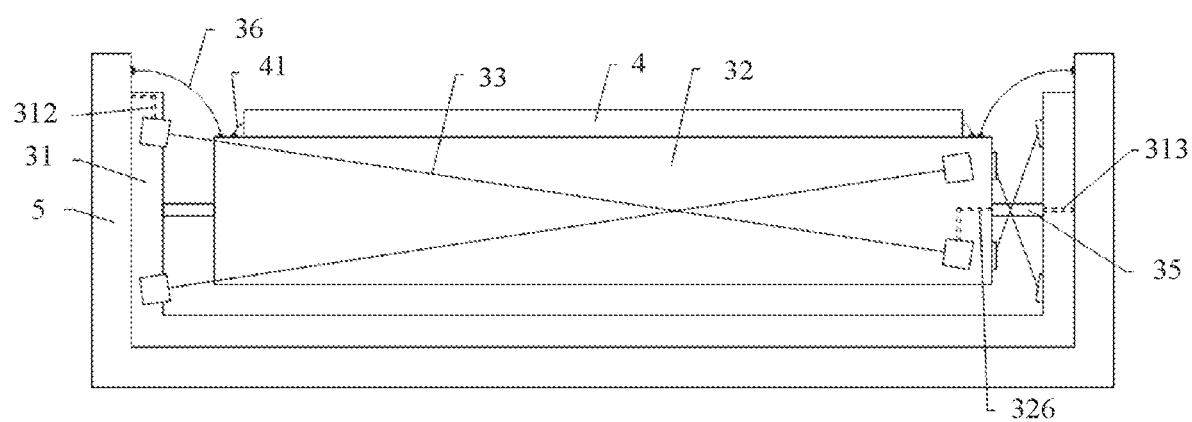
FIG. 15 is a schematic diagram of a partial structure of the camera module shown in FIG. 3 in still some other embodiments.
Figure 16:
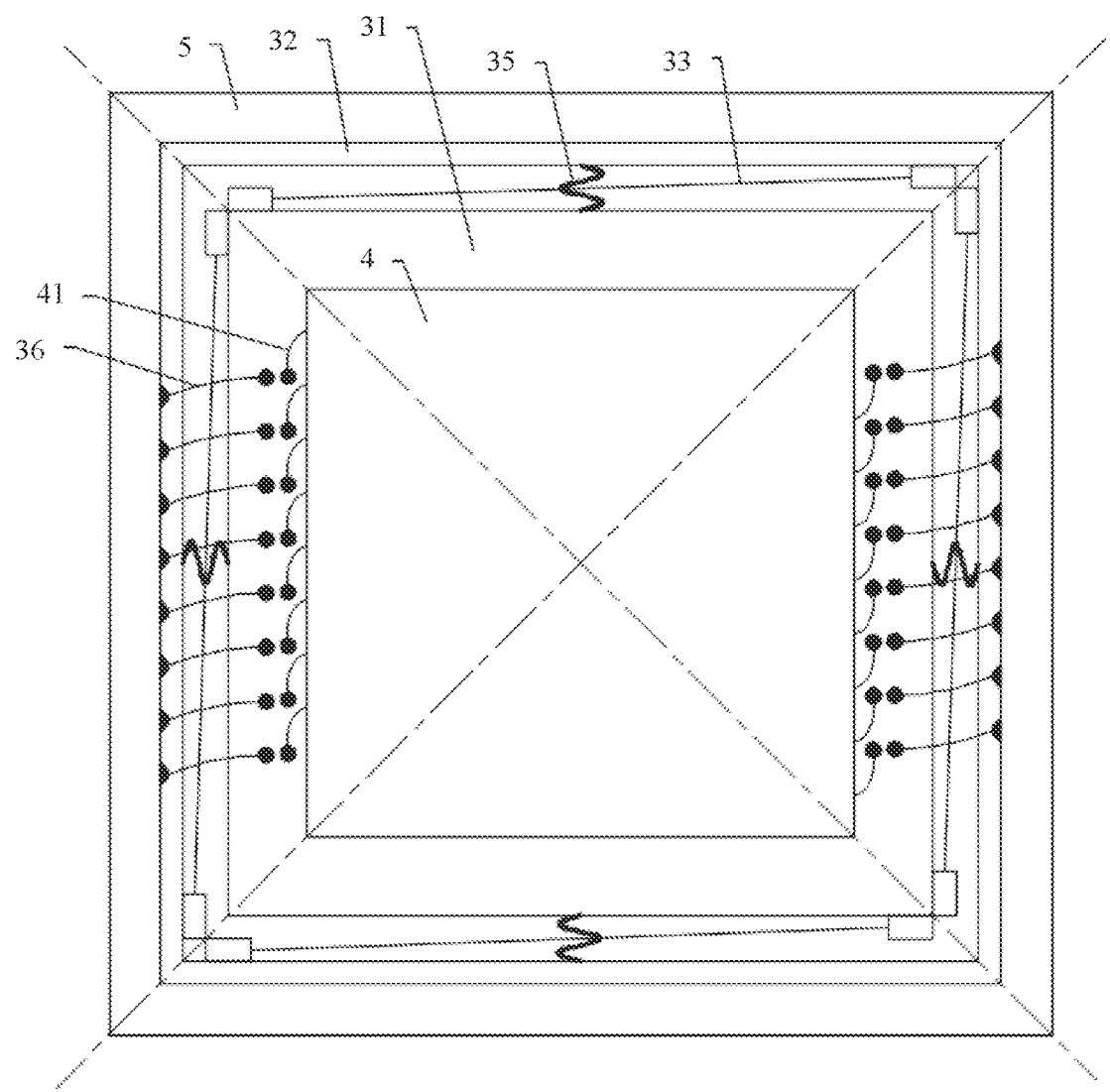
FIG. 16 is a schematic diagram of the structure shown in FIG. 15 from another angle.

Refer to FIG. 15 and FIG. 16 together. FIG. 15 is a schematic diagram of a partial structure of the camera module 10 shown in FIG. 3 in still some embodiments, and FIG. 16 is a schematic diagram of the structure shown in FIG. 15 from another angle. FIG. 15 and FIG. 16 show the image sensor 4, the SMA motor 3, and the circuit board 5 of the camera module 10. Some SMA cables 33 are omitted in FIG. 15 and FIG. 16. The following mainly describes differences between this embodiment and the foregoing embodiments, and most content of this embodiment that is the same as the content of the foregoing embodiments is not described again.

The image sensor 4 is electrically connected to the carrier 32 through a plurality of bonding wires 41, and the carrier 32 is electrically connected to the circuit board 5 through a connecting wire 36. A circuit is formed on the carrier 32 to electrically connect the bonding wire 41 to the connecting wire 36. A first electric-conductor 326 is disposed on the carrier 32, a second electric-conductor 312 is disposed on the motor frame 31, and the SMA motor 3 further includes a conductive connecting piece 35. The second electric-conductor 312 electrically connects the circuit board 5 to the fixed end of the SMA cable 33, and the movable end of the SMA cable 33 is electrically connected to the first electric-conductor 326. The conductive connecting piece 35 electrically connects the first electric-conductor 326 to the circuit board 5. The conductive connecting piece 35 is a spring, the conductive connecting piece 35 is located between the carrier 32 and the motor frame 31, the motor frame 31 further includes a third electric-conductor 313, and the third electric-conductor 313 electrically connects the conductive connecting piece 35 to the circuit board 5.

Figure 17:
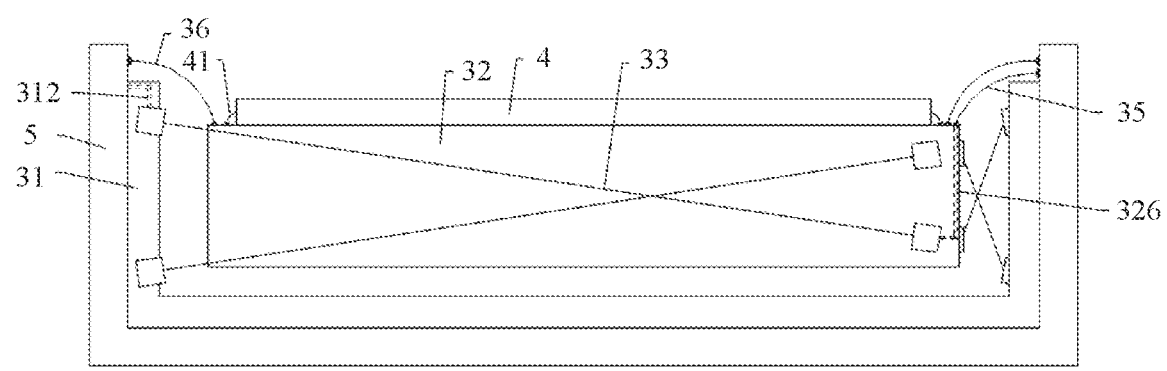
FIG. 17 is a schematic diagram of a partial structure of the camera module shown in FIG. 3 in yet some other embodiments.
Figure 18:
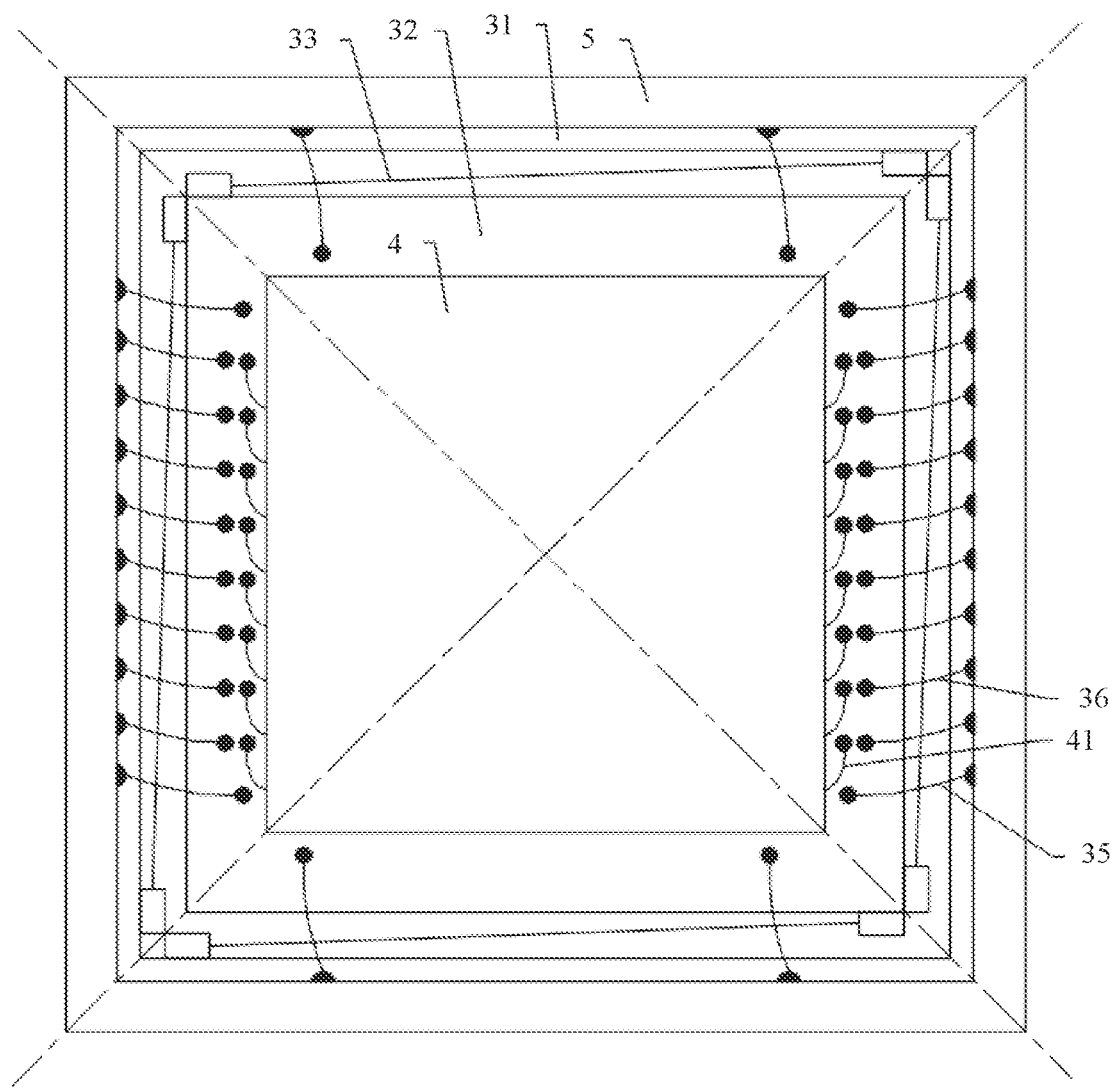
FIG. 18 is a schematic diagram of the structure shown in FIG. 17 from another angle.

Refer to FIG. 17 and FIG. 18 together. FIG. 17 is a schematic diagram of a partial structure of the camera module 10 shown in FIG. 3 in still some embodiments, and FIG. 18 is a schematic diagram of the structure shown in FIG. 17 from another angle. FIG. 17 and FIG. 18 show the image sensor 4, the SMA motor 3, and the circuit board 5 of the camera module 10. Some SMA cables 33 are omitted in FIG. 17 and FIG. 18. The following mainly describes differences between this embodiment and the foregoing embodiments, and most content of this embodiment that is the same as the content of the foregoing embodiments is not described again.

The image sensor 4 is electrically connected to the carrier 32 through a plurality of bonding wires 41, and the carrier 32 is electrically connected to the circuit board 5 through a connecting wire 36. A first electric-conductor 326 is disposed on the carrier 32, a second electric-conductor 312 is disposed on the motor frame 31, and the SMA motor 3 further includes a conductive connecting piece 35. The second electric-conductor 312 electrically connects the circuit board 5 to the fixed end of the SMA cable 33, and the movable end of the SMA cable 33 is electrically connected to the first electric-conductor 326. The conductive connecting piece 35 electrically connects the first electric-conductor 326 to the circuit board 5. The conductive connecting piece 35 is a conducting wire, and the conductive connecting piece 35 is connected to the circuit board 5.

In some other embodiments, the image sensor 4 may alternatively be electrically connected to the carrier 32, and then conducted to the circuit board 5 through the carrier 32 and the motor frame 31. A circuit of the carrier 32 and a circuit of the motor frame 31 may be formed by electroplating, or by bonding a flexible circuit board, or by embedding metal through insert molding (insert molding). This is not strictly limited in this application.

Figure 19:
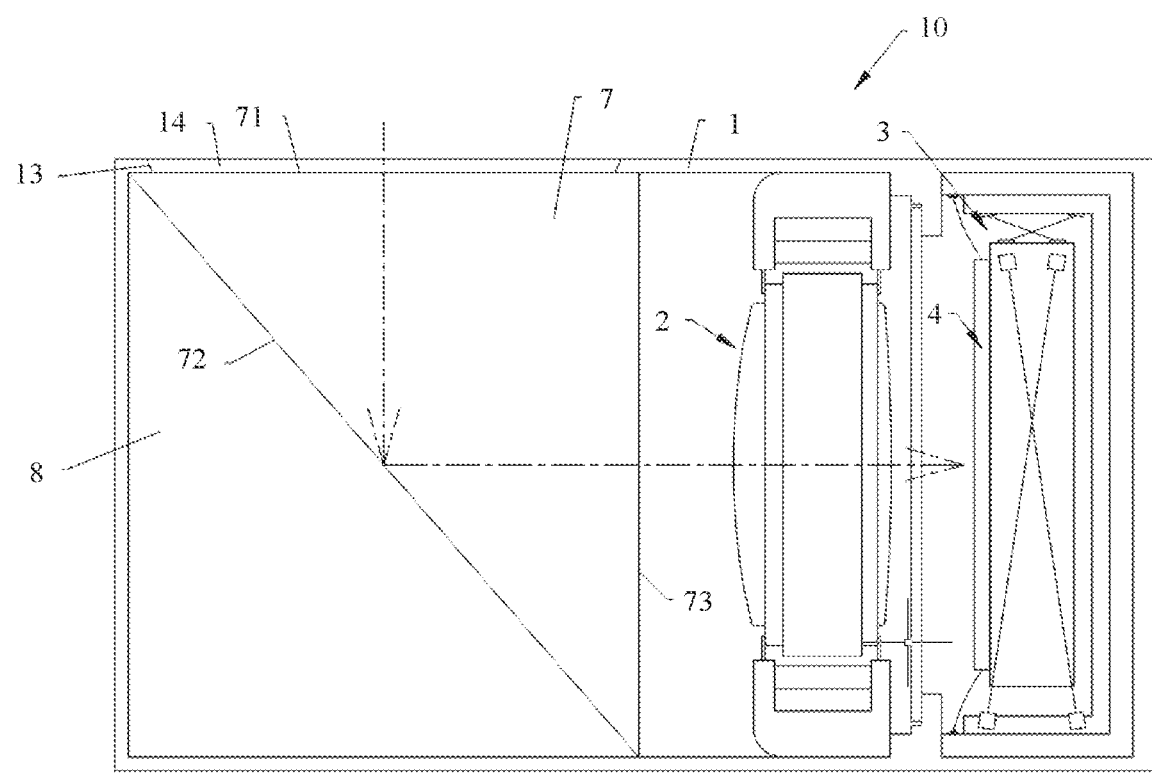
FIG. 19 is a schematic diagram of a structure of a camera module in a second embodiment according to an embodiment of this application.

FIG. 19 is a schematic diagram of a structure of a camera module 10 in a second embodiment according to an embodiment of this application. The following mainly describes differences between this embodiment and the foregoing embodiments, and most content of this embodiment that is the same as the content of the foregoing embodiments is not described again.

In some embodiments, the camera module 10 may alternatively be a periscope long-focus camera module 10. The camera module 10 further includes a prism (prism) 7. The prism 7 is fastened within the module frame 1 and is located on an in-light side of the camera lens 2. The module frame 1 has an in-light hole 13 that is disposed facing the prism 7. Ambient light is deflected after passing through the prism 7, so as to smoothly enter the camera lens 2. By deflecting an optical path through the prism 7, the camera module 10 can distribute its thickness in two directions, to avoid problems such as assembly difficulty caused by an excessively large module thickness.

A conventional periscope camera module is provided with a plurality of groups of prism actuating motors, the prism actuating motors actuate the prism to rotate to implement image stabilization, and the voice coil motor actuates the camera lens to implement focus. This module structure is complex and difficult to implement, and has poor reliability. In this embodiment, the camera module 10 actuates, through the SMA motor 3, the image sensor 4 to shift or rotate, so as to implement auto focus and optical image stabilization. Therefore, compared with a conventional solution, this embodiment provides the camera module 10 in which a prism actuating motor may be omitted, and the prism 7 is fastened on the module frame 1. In this way, the module structure is simplified, the structure reliability is improved, the costs are reduced and the power consumption is reduced on the basis that long-focus performance, auto-focus performance, and optical image stabilization performance are achieved.

For example, the camera module 10 further includes a prism frame 8, the prism frame 8 is fastened to the module frame 1, and the prism 7 is fastened to the prism frame 8. The prism 7 is shaped as a triangular prism. Ambient light enters the prism 7 through a cathetus side 71 of the prism 7 facing the in-light hole 13, is reflected on a hypotenuse side 72 of the prism 7, is emitted from another cathetus side 73 of the prism 7 facing the camera lens 2 to the image sensor 4 through the camera lens 2.

For example, the camera module 10 may further include an optical stop 14. The optical stop 14 is mounted on the module frame 1 and covers the in-light hole 13. The optical stop 14 may be used for light guiding, dust prevention, appearance decoration, and the like.

Figure 20:
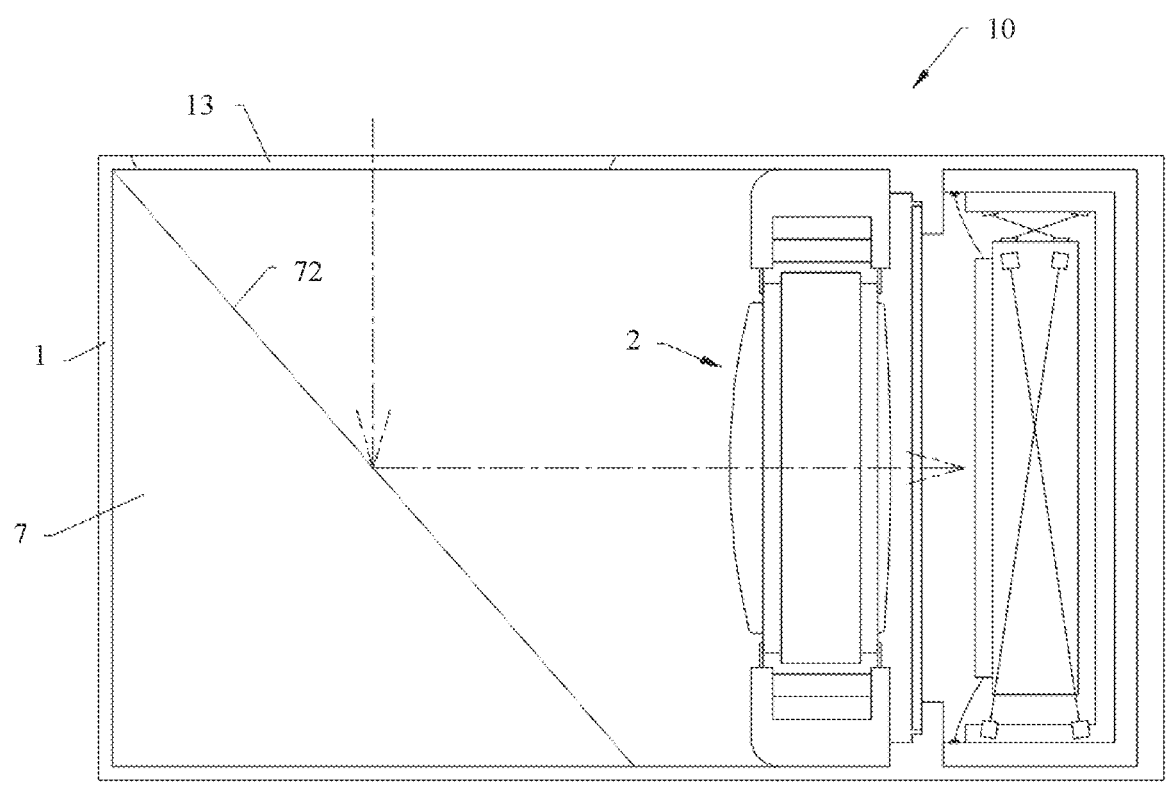
FIG. 20 is a schematic diagram of a structure of a camera module in a third embodiment according to an embodiment of this application.

FIG. 20 is a schematic diagram of a structure of a camera module 10 in a third embodiment according to an embodiment of this application. The following mainly describes differences between this embodiment and the foregoing embodiments, and most content of this embodiment that is the same as the content of the foregoing embodiments is not described again.

In this embodiment, the prism 7 is directly fastened to the module frame I. The hypotenuse side 72 of the prism 7 faces both the in-light hole 13 and the camera lens 2. After being emitted from the hypotenuse side 72 of the prism 7, ambient light directly enters the camera lens 2, and no longer enters the prism 7. In this case, such a small loss of the ambient light in a transmission process helps improve imaging quality of the camera module 10.

For example, the camera module 10 shown in FIG. 15 and FIG. 16 may be applied to a small environment in which long-focus photographing, auto focus, and optical image stabilization are required. For example, the camera module 10 may be used as a camera module 10 of a rear-facing camera assembly 400 of an electronic device 1000. This is not strictly limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. If there is no conflict, the embodiments of this application and the features in the embodiments may be combined with each other. Therefore, the protection scope of this application shall be subject to the protection scope of the claims.

What is claimed is:

1. A camera system comprising:
a module frame comprising an in-light hole;
a camera lens coupled to the module frame, and comprising an in-light side and an out-light side, and having an optical axis;
a prism located on the in-light side and fastened within the module frame, wherein the in-light hole faces the prism;
a shape memory alloy (SMA) motor located on the out-light side; and
an image sensor located between the camera lens and the SMA motor and fastened to the SMA motor,
wherein the camera lens, the image sensor, and the SMA motor are stacked within the module frame, and
wherein the SMA motor is configured to:
actuate the image sensor to shift in a direction parallel to the optical axis; and
actuate the image sensor to shift on a plane perpendicular to the optical axis.

2. The camera system of claim 1, wherein the SMA motor comprises:
a motor frame fastened within the module frame;
a carrier located within the motor frame and comprising a first side fastened to the image sensor and facing the camera lens; and
a plurality of SMA cables disposed in pairs and configured to shrink when electrified or heated, wherein each SMA cable comprises a movable end and a fixed end, wherein movable ends of four pairs of the SMA cables are respectively fastened to four sides of the carrier, wherein fixed ends of the four pairs are respectively fastened to different positions of the motor frame, wherein two pairs of the four pairs and another two pairs of the four pairs are symmetrically disposed relative to a first reference plane, wherein the two pairs on a same side of the first reference plane are symmetrically disposed relative to a second reference plane, wherein two SMA cables of a same pair are symmetrically disposed relative to a third reference plane, wherein both the first reference plane and the second reference plane are traversed by the optical axis, and wherein the third reference plane is perpendicular to the optical axis.

3. The camera system of claim 2, wherein the carrier comprises:
a second side comprising two sides;
a third side, wherein the second side and the third side are symmetrically disposed relative to the second reference plane; and
a fourth side, wherein the third side and the fourth side are respectively connected to the two sides, wherein the second side and the fourth side are symmetrically disposed relative to the first reference plane, wherein the third reference plane intersects with the second side, the third side, and the fourth side,
wherein the SMA cables comprise:
a first SMA cable comprising a first movable end and a first fixed end disposed close to the third side relative to the first movable end;
a second SMA cable comprising a second movable end and a second fixed end disposed close to the third side relative to the second movable end, wherein both the first movable end and the second movable end are fastened to an end of the second side close to the third side, wherein the first SMA cable intersects with the second SMA cable, and wherein the first SMA cable and the second SMA cable are symmetrically disposed relative to the third reference plane;
a third SMA cable, wherein the third SMA cable and the first SMA cable are symmetrically disposed relative to the second reference plane;
a fourth SMA cable, wherein the fourth SMA cable and the second SMA cable are symmetrically disposed relative to the second reference plane;
a fifth SMA cable, wherein the fifth SMA cable and the third SMA cable are symmetrically disposed relative to the first reference plane;
a sixth SMA cable, wherein the sixth SMA cable and the fourth SMA cable are symmetrically disposed relative to the first reference plane;
a seventh SMA cable, wherein the seventh SMA cable and the fifth SMA cable are symmetrically disposed relative to the second reference plane; and
an eighth SMA cable, wherein the eighth SMA cable and the sixth SMA cable are symmetrically disposed relative to the second reference plane.

4. The camera system of claim 2, wherein the SMA motor further comprises a circuit board located between the motor frame and the module frame, and wherein the image sensor is electrically connected to the circuit board through a plurality of bonding wires.

5. The camera system of claim 2, wherein the SMA motor further comprises a circuit board located between the motor frame and the module frame, wherein the image sensor is electrically connected to the carrier through a plurality of bonding wires, and wherein the carrier is electrically connected to the circuit board through a connecting wire.

6. The camera system of claim 4, further comprising:
a first electric-conductor disposed on the carrier and electrically connected to the movable end; and
a second electric-conductor disposed on the motor frame and electrically connects the circuit board to the fixed end, wherein the SMA motor further comprises a conductive connecting piece, that electrically connects the first electric-conductor to the circuit board.

7. The camera system of claim 6, wherein the conductive connecting piece is a spring and located between the carrier and the motor frame, and wherein the motor frame further comprises a third electric-conductor that electrically connects the conductive connecting piece to the circuit board.

8. The camera system of claim 6, wherein the conductive connecting piece is a conducting wire and connected to the circuit board.

9. An electronic device comprising:
a housing; and
a camera system accommodated in the housing and comprising:
a module frame comprising an in-light hole;
a camera lens coupled to the module frame and comprising an in-light side and an out-light side, and having an optical axis;
a prism located on the in-light side and fastened within the module frame, wherein the in-light hole faces the prism;
a shape memory alloy (SMA) motor located on the out-light side; and
an image sensor located between the camera lens and the SMA motor and fastened to the SMA motor,
wherein the camera lens, the image sensor, and the SMA motor are stacked within the module frame, and
wherein the SMA motor is configured to:
actuate the image sensor to shift in a direction parallel to the optical axis; and
actuate the image sensor to shift on a plane perpendicular to the optical axis.

10. The electronic device of claim 9, wherein the SMA motor comprises:
a motor frame fastened within the module frame;
a carrier located within the motor frame and comprising a first side fastened to the image sensor and facing the camera lens; and
a plurality of SMA cables disposed in pairs and configured to shrink when electrified or heated, wherein each SMA cable comprises a movable end and a fixed end, wherein movable ends of four pairs of the SMA cables are respectively fastened to four sides of the carrier, wherein fixed ends of the four pairs are respectively fastened to different positions of the motor frame, wherein two pairs of the four pairs and another two pairs of the four pairs are symmetrically disposed relative to a first reference plane, wherein the two pairs on a same side of the first reference plane are symmetrically disposed relative to a second reference plane, wherein two SMA cables of a same pair are symmetrically disposed relative to a third reference plane, wherein both the first reference plane and the second reference plane are traversed by the optical axis, and wherein the third reference plane is perpendicular to the optical axis.

11. The electronic device of claim 10, wherein the carrier comprises:
a second side comprising two sides;
a third side, wherein the second side and the third side are symmetrically disposed relative to the second reference plane; and
a fourth side, wherein the third side and the fourth side are respectively connected to the two sides, wherein the second side and the fourth side are symmetrically disposed relative to the first reference plane, wherein the third reference plane intersects with the second side, the third side, and the fourth side, and wherein the SMA cables comprise:
a first SMA cable comprising a first movable end and a first fixed end disposed close to the third side relative to the first movable end;
a second SMA cable comprising a second movable end and a second fixed end disposed close to the third side relative to the second movable end, wherein both the first movable end and the second movable end are fastened to an end of the second side close to the third side, wherein the first SMA cable intersects with the second SMA cable, and wherein the first SMA cable and the second SMA cable are symmetrically disposed relative to the third reference plane;
a third SMA cable, wherein the third SMA cable and the first SMA cable are symmetrically disposed relative to the second reference plane;
a fourth SMA cable, wherein the fourth SMA cable and the second SMA cable are symmetrically disposed relative to the second reference plane;
a fifth SMA cable, wherein the fifth SMA cable and the third SMA cable are symmetrically disposed relative to the first reference plane;
a sixth SMA cable, wherein the sixth SMA cable and the fourth SMA cable are symmetrically disposed relative to the first reference plane;
a seventh SMA cable, wherein the seventh SMA cable and the fifth SMA cable are symmetrically disposed relative to the second reference plane; and an eighth SMA cable, wherein the eighth SMA cable and the sixth SMA cable are symmetrically disposed relative to the second reference plane.

12. The electronic device of claim 10, wherein the SMA motor further comprises a circuit board located between the motor frame and the module frame, and wherein the image sensor is electrically connected to the circuit board through a plurality of bonding wires.

13. The electronic device of claim 10, wherein the SMA motor further comprises a circuit board located between the motor frame and the module frame, wherein the image sensor is electrically connected to the carrier through a plurality of bonding wires, and wherein the carrier is electrically connected to the circuit board through a connecting wire.

14. The electronic device of claim 12, wherein the camera system further comprises:
a first electric-conductor disposed on the carrier and electrically connected to the movable end; and
a second electric-conductor disposed on the motor frame and electrically connects the circuit board to the fixed end, wherein the SMA motor further comprises a conductive connecting piece that electrically connects the first electric-conductor to the circuit board.

15. The electronic device of claim 14, wherein the conductive connecting piece is a spring and located between the carrier and the motor frame, and wherein the motor frame further comprises a third electric-conductor that electrically connects the conductive connecting piece to the circuit board.

16. The electronic device of claim 14, wherein the conductive connecting piece is a conducting wire and is connected to the circuit board.

17. The electronic device of claim 9, wherein the SMA motor is further configured to actuate the image sensor to rotate to tilt relative to the optical axis.

18. The camera system of claim 1, wherein the SMA motor is further configured to actuate the image sensor to rotate to tilt relative to the optical axis.

* * * * *

UNITED STATES PATENT AND TRADEMARK OFFICE
CERTIFICATE OF CORRECTION

| | |
|---|---|
| PATENT NO. | : 12,015,849 B2 |
| APPLICATION NO. | : 17/780850 |
| DATED | : June 18, 2024 |
| INVENTOR(S) | : Gang Wang et al. |

It is certified that error appears in the above-identified patent and that said Letters Patent is hereby corrected as shown below:

On the Title Page

Column 2 Item (57) Abstract should read: "A camera system includes a module frame, a camera lens, an image sensor, and an SMA motor that are stacked within the module frame. The camera lens is fixedly connected to the module frame, and the SMA motor is located on an out-light side of the camera lens. The image sensor is located between the camera lens and the SMA motor and is fastened to the SMA motor. The SMA motor is configured to actuate the image sensor to shift in a direction parallel to an optical axis of the camera lens. The SMA motor is further configured to actuate the image sensor to shift on a plane perpendicular to the optical axis of the camera lens and/or actuate the image sensor to rotate to tilt relative to the optical axis of the camera lens."

Signed and Sealed this
Sixth Day of August, 2024

Katherine Kelly Vidal
*Director of the United States Patent and Trademark Office*